Dec. 22, 1953

W. S. REYNOLDS ET AL

LOADING MACHINE FOR SHELLS, INCLUDING AUTOMATIC INSPECTION MEANS 2,663,421

Filed July 14, 1948

29 Sheets-Sheet 1

INVENTORS
WARREN S. REYNOLDS
JOHN R. TURNER
LEON C. FRANDSEN
BY John H. Lewis Jr.
ATTORNEYS Dec. 22, 1953

W. S. REYNOLDS ET AL
LOADING MACHINE FOR SHELLS, INCLUDING
AUTOMATIC INSPECTION MEANS 2,663,421

Filed July 14, 1948

29 Sheets-Sheet 2

INVENTORS
WARREN S. REYNOLDS
JOHN R. TURNER
LEON C. FRANDSEN
BY John H. Lewis Jr.
ATTORNEYS INVENTORS
WARREN S. REYNOLDS
JOHN R. TURNER
LEON C. FRANDSEN
BY John H. Lewis Jr.
ATTORNEYS Dec. 22, 1953

W. S. REYNOLDS ET AL

LOADING MACHINE FOR SHELLS, INCLUDING AUTOMATIC INSPECTION MEANS 2,663,421

Filed July 14, 1948

29 Sheets-Sheet 4

INVENTORS
WARREN S. REYNOLDS
JOHN R. TURNER
LEON C. FRANDSEN
BY John H. Lewis Jr.
ATTORNEYS INVENTORS
WARREN S. REYNOLDS
JOHN R. TURNER
LEON C. FRANDSEN
BY John H. Lewis Jr.
ATTORNEYS Dec. 22, 1953 W. S. REYNOLDS ET AL 2,663,421
LOADING MACHINE FOR SHELLS, INCLUDING
AUTOMATIC INSPECTION MEANS Filed July 14, 1948 29 Sheets-Sheet 6

INVENTORS
WARREN S. REYNOLDS
JOHN R. TURNER
LEON C. FRANDSEN
BY John H. Lewis Jr.
ATTORNEYS INVENTORS
WARREN S. REYNOLDS
JOHN R. TURNER
LEON C. FRANDSEN
BY John H. Lewis Jr.
ATTORNEYS Dec. 22, 1953 W. S. REYNOLDS ET AL 2,663,421

LOADING MACHINE FOR SHELLS, INCLUDING AUTOMATIC INSPECTION MEANS

Filed July 14, 1948 29 Sheets-Sheet 8

INVENTORS
WARREN S. REYNOLDS
JOHN R. TURNER
LEON C. FRANDSEN
BY John H. Lewis Jr.
ATTORNEYS INVENTORS
WARREN S. REYNOLDS
JOHN R. TURNER
LEON C. FRANDOSEN
BY John H. Lewis Jr.
ATTORNEYS Dec. 22, 1953 W. S. REYNOLDS ET AL 2,663,421

LOADING MACHINE FOR SHELLS, INCLUDING AUTOMATIC INSPECTION MEANS

Filed July 14, 1948 29 Sheets-Sheet 10

INVENTORS
WARREN S. REYNOLDS
JOHN R. TURNER
LEON C. FRANDSEN
BY John H. Lewis Jr.
ATTORNEYS INVENTORS
WARREN S. REYNOLDS
JOHN R. TURNER
LEON C. FRANDSEN
BY John H. Lewis Jr.
ATTORNEYS INVENTORS
WARREN S. REYNOLDS
JOHN R. TURNER
LEON C. FRANDSEN
BY John H. Lewis Jr.
ATTORNEYS Dec. 22, 1953 W. S. REYNOLDS ET AL 2,663,421

LOADING MACHINE FOR SHELLS, INCLUDING AUTOMATIC INSPECTION MEANS

Filed July 14, 1948 29 Sheets-Sheet 13

INVENTORS
WARREN S. REYNOLDS
JOHN R. TURNER
LEON C. FRANDSEN
BY John H. Lewis Jr.
ATTORNEYS INVENTORS
WARREN S. REYNOLDS
JOHN R. TURNER
LEON C. FRANDSEN
BY John H. Lewis Jr.
ATTORNEYS INVENTORS
WARREN S. REYNOLDS
JOHN R. TURNER
LEON C. FRANDSEN
BY John H. Lewis Jr.
ATTORNEYS INVENTORS
WARREN S. REYNOLDS
JOHN R. TURNER
LEON C. FRANDSEN
BY John H. Lewis Jr.
ATTORNEYS Dec. 22, 1953

W. S. REYNOLDS ET AL
LOADING MACHINE FOR SHELLS, INCLUDING
AUTOMATIC INSPECTION MEANS 2,663,421

Filed July 14, 1948

29 Sheets-Sheet 17

INVENTORS
WARREN S. REYNOLDS
JOHN R. TURNER
LEON C. FRANDSEN
BY John H. Lewis Jr.
ATTORNEYS Dec. 22, 1953

W. S. REYNOLDS ET AL

LOADING MACHINE FOR SHELLS, INCLUDING AUTOMATIC INSPECTION MEANS 2,663,421

Filed July 14, 1948

29 Sheets-Sheet 18

INVENTORS
WARREN S. REYNOLDS
JOHN R. TURNER
LEON C. FRANDSEN

BY John H. Lewis Jr.
ATTORNEYS

INVENTORS
WARREN S. REYNOLDS
JOHN R. TURNER
LEON C. FRANDSEN
BY John H. Lewis Jr.
ATTORNEYS Dec. 22, 1953 W. S. REYNOLDS ET AL 2,663,421

LOADING MACHINE FOR SHELLS, INCLUDING AUTOMATIC INSPECTION MEANS

Filed July 14, 1948 29 Sheets-Sheet 20

INVENTORS
WARREN S. REYNOLDS
JOHN R. TURNER
LEON C. FRANDSEN
BY John H. Lewis Jr.
ATTORNEYS Dec. 22, 1953 W. S. REYNOLDS ET AL 2,663,421

LOADING MACHINE FOR SHELLS, INCLUDING AUTOMATIC INSPECTION MEANS

Filed July 14, 1948 29 Sheets-Sheet 21

INVENTORS
WARREN S. REYNOLDS
JOHN R. TURNER
LEON C. FRANDSEN
BY John H. Lewis Jr.
ATTORNEYS INVENTORS
WARREN S. REYNOLDS
JOHN R. TURNER
LEON C. FRANDSEN
BY John H. Lewis Jr.
ATTORNEYS Dec. 22, 1953 W. S. REYNOLDS ET AL 2,663,421

LOADING MACHINE FOR SHELLS, INCLUDING AUTOMATIC INSPECTION MEANS

Filed July 14, 1948 29 Sheets-Sheet 23

INVENTORS
WARREN S. REYNOLDS
JOHN R. TURNER
LEON C. FRANDSEN
BY John H. Lewis Jr.
ATTORNEYS INVENTORS
WARREN S. REYNOLDS
JOHN R. TURNER
LEON C. FRANDSEN
BY John H. Lewis Jr.
ATTORNEYS INVENTORS
WARREN S. REYNOLDS
JOHN R. TURNER
LEON C. FRANDSEN
BY John H. Lewis Jr.
ATTORNEYS INVENTORS
WARREN S. REYNOLDS
JOHN R. TURNER
LEON C. FRANDSEN
BY John H. Lewis Jr.
ATTORNEYS INVENTORS
WARREN S. REYNOLDS
JOHN R. TURNER
LEON C. FRANDSEN
BY John H. Lewis Jr.
ATTORNEYS INVENTORS
WARREN S. REYNOLDS
JOHN R. TURNER
LEON C. FRANDSEN
BY John H. Lewis Jr.
ATTORNEYS Dec. 22, 1953 W. S. REYNOLDS ET AL 2,663,421

LOADING MACHINE FOR SHELLS, INCLUDING AUTOMATIC INSPECTION MEANS

Filed July 14, 1948 29 Sheets-Sheet 29

INVENTORS
WARREN S. REYNOLDS
JOHN R. TURNER
LEON C. FRANDSEN

BY John H. Lewis Jr.
ATTORNEYS

Patented Dec. 22, 1953

2,663,421

UNITED STATES PATENT OFFICE 2,663,421

LOADING MACHINE FOR SHELLS, INCLUDING AUTOMATIC INSPECTION MEANS

Warren S. Reynolds, Westport, John R. Turner, Stratford, and Leon C. Frandsen, Trumbull, Conn., assignors to Remington Arms Company, Inc., Bridgeport, Conn., a corporation of Delaware Application July 14, 1948, Serial No. 38,588

13 Claims. (Cl. 209—82)

This invention relates to a machine for loading shot shells and has particular reference to the type of such machine wherein shot shell bodies are presented mouth-up at successive stations where they are inspected, the various components properly placed, closed, printed with suitable identification, and ejected. Multiple inspections are provided and serve to operate reject mechanism in the event of the defect, absence of, or mis-measurement of any component. By the interchange of tools at certain stations, the machine may be adapted to the production of shells closed with the well-known top wad and roll crimp or the more recently developed wadless closure such as that shown in the patent to Finlay et al., No. 2,242,907, dated May 20, 1941.

This invention has as its principal object the provision of a machine capable of loading shot shells with greater accuracy and at greatly increased rates by comparison with existing types of equipment.

The exact nature of the invention as well as other objects and advantages thereof, both in regard to the complete construction and to certain sub-assemblies therein, will become clearly apparent from consideration of the following drawings, wherein.

Figures 5, 5A:
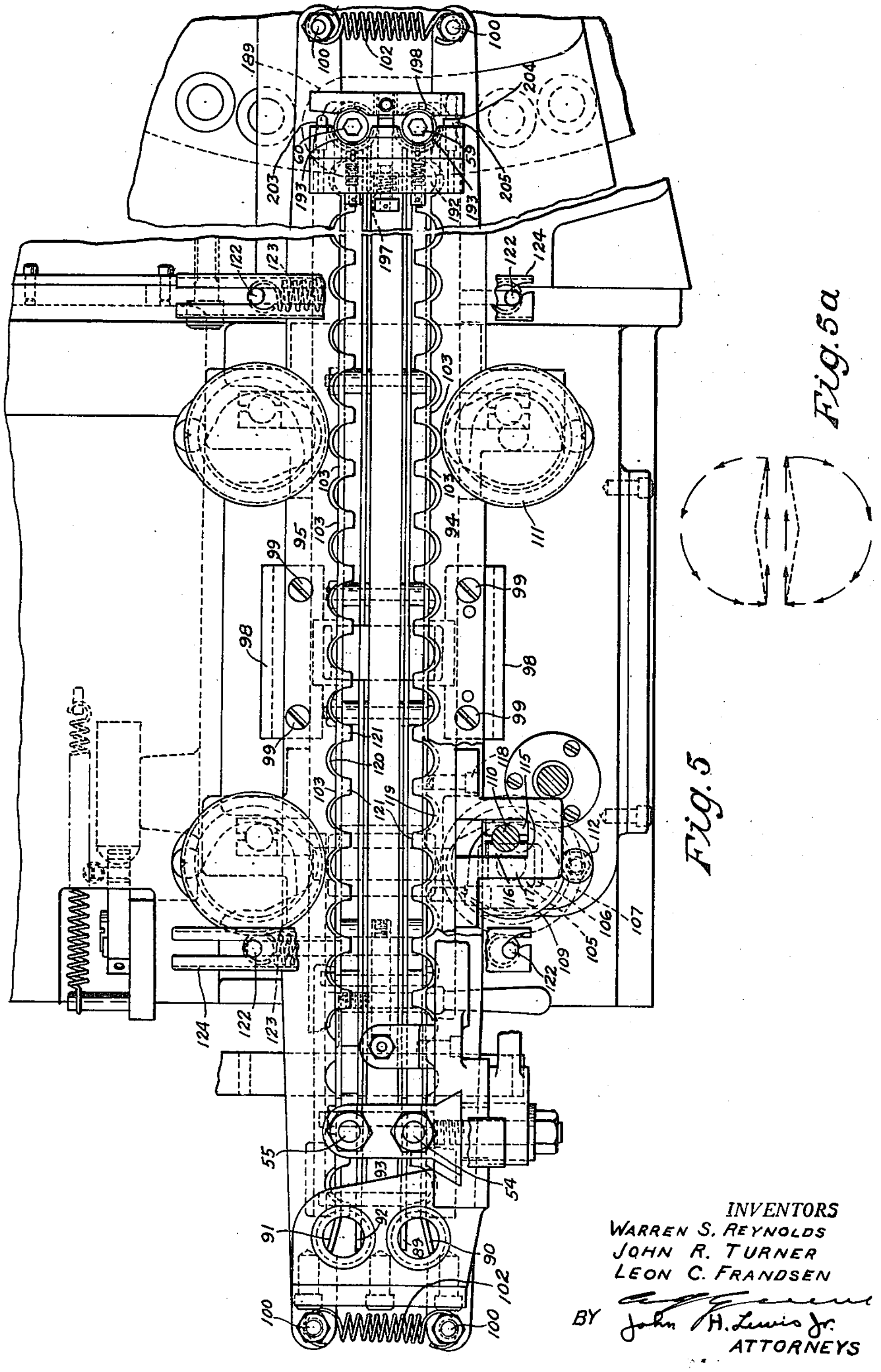
Fig. 5 is a plan view showing the straight line feed. Similar parts have been broken away at various levels to show parts otherwise concealed.

Fig. 5*a* is a schematic view illustrating the path of movement of the transfer bars.

Figure 6:
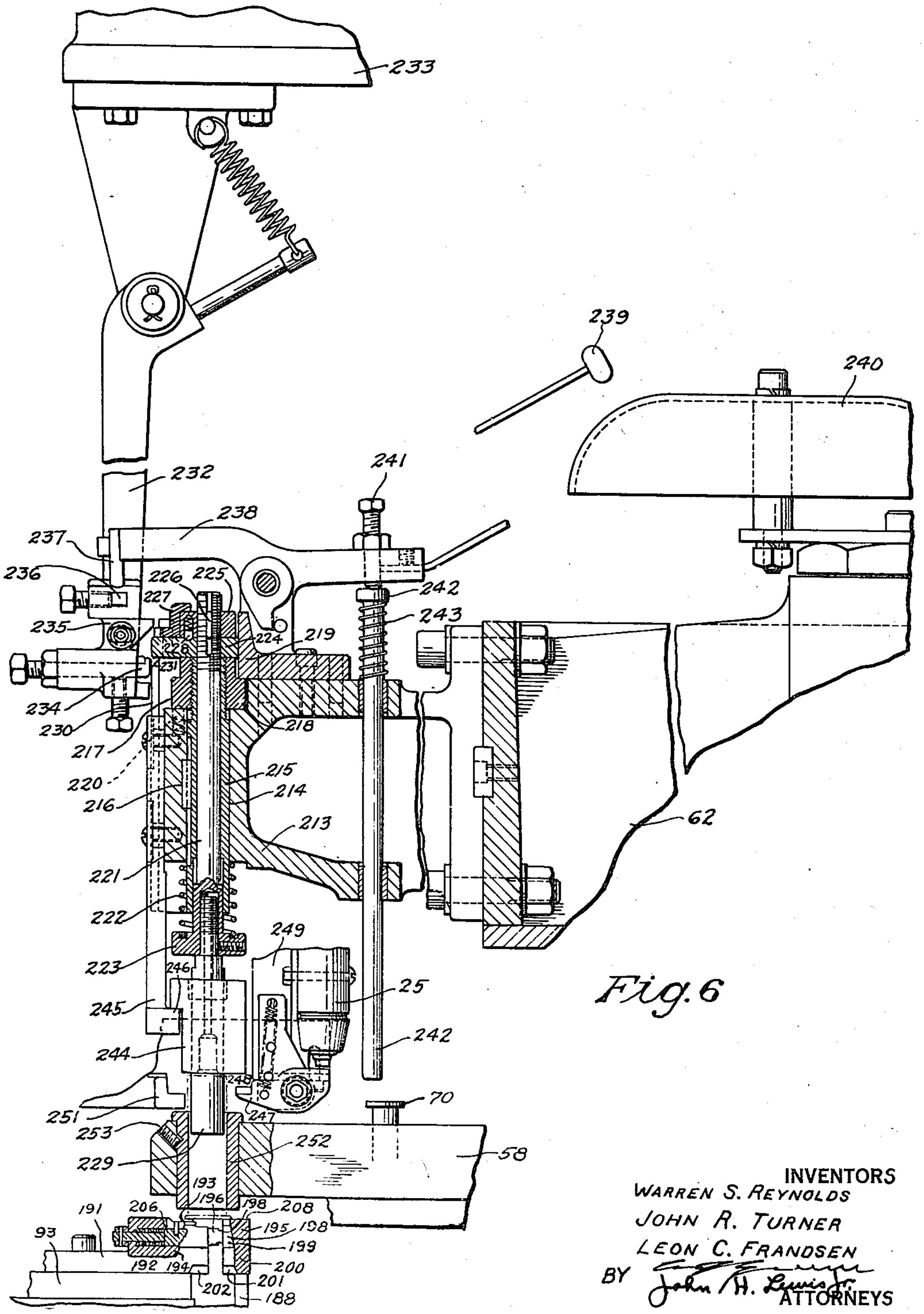

Fig. 6 is a vertical sectional view of the dial station inspection mechanism arranged to inspect for the weight of powder and presence of a shell in the dial.

Figures 7, 8:
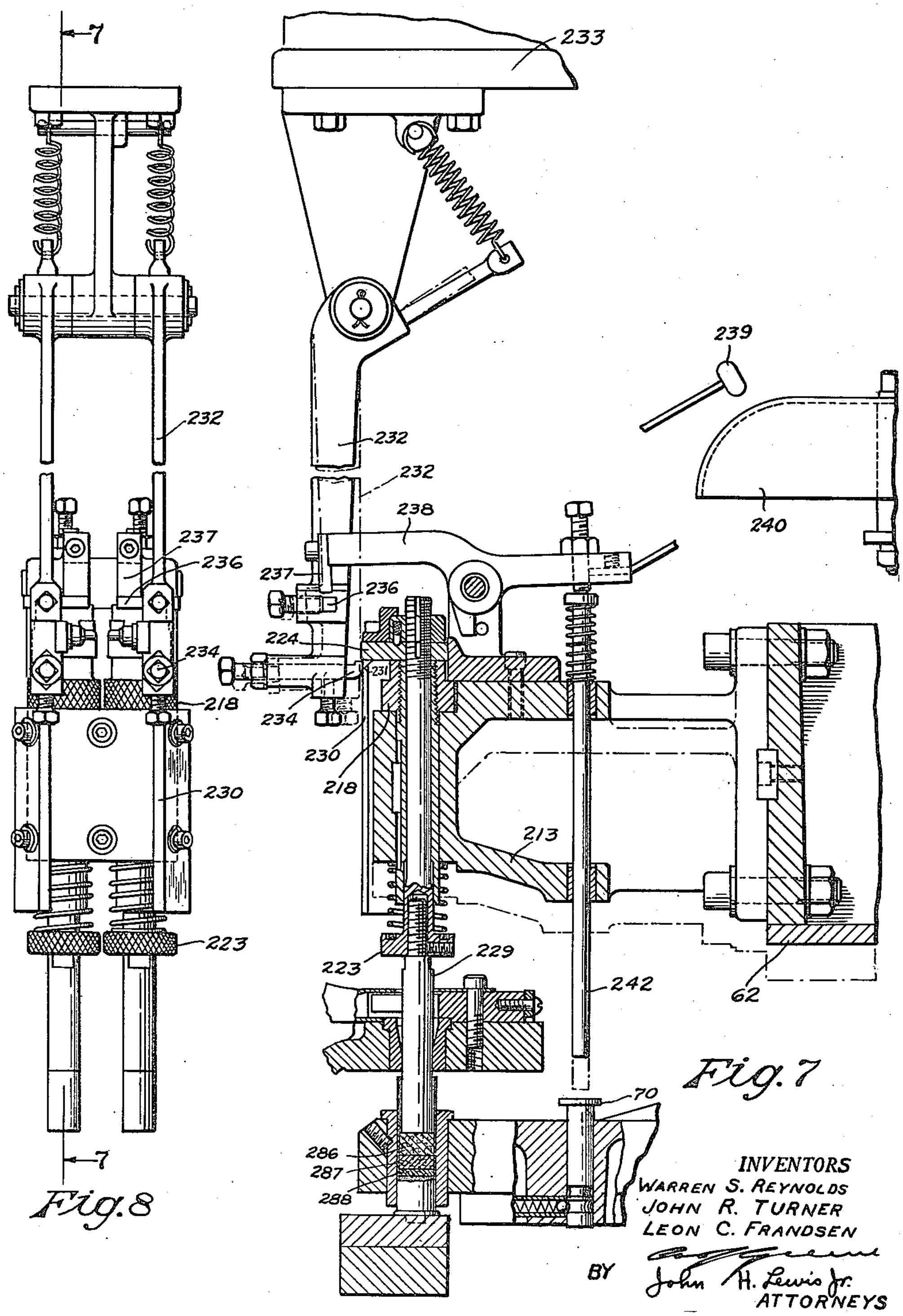

Fig. 7 is a vertical sectional view through one of the inspection and wad feed punch fixtures.

Figure 7A:
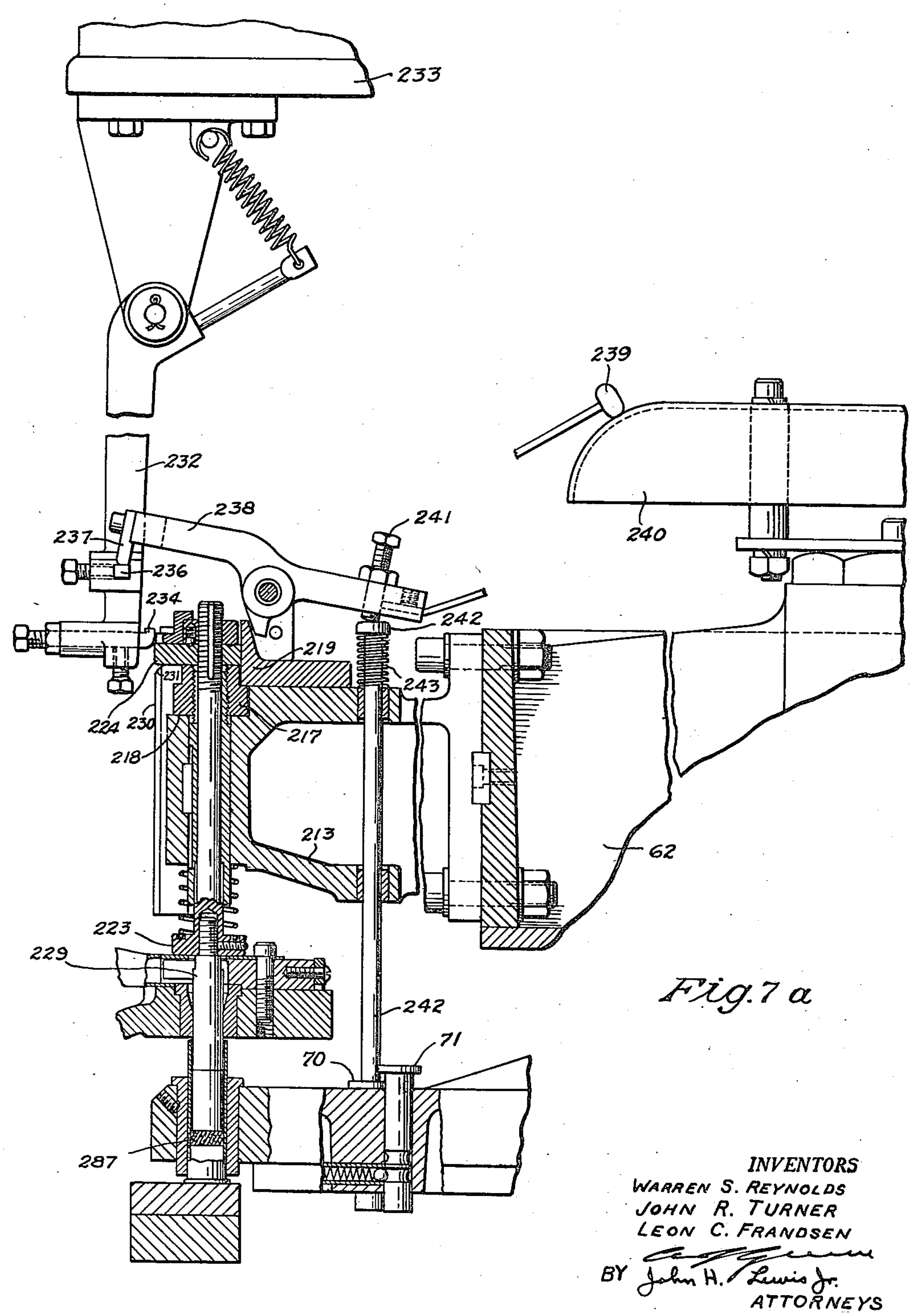

Fig. 7*a* is a view corresponding to Fig. 7 with the mechanism in the positions to which it would be moved by the detection of an improperly assembled shell.

Fig. 8 is an elevational view of the inspection mechanism shown in Fig. 7.

Figure 9:
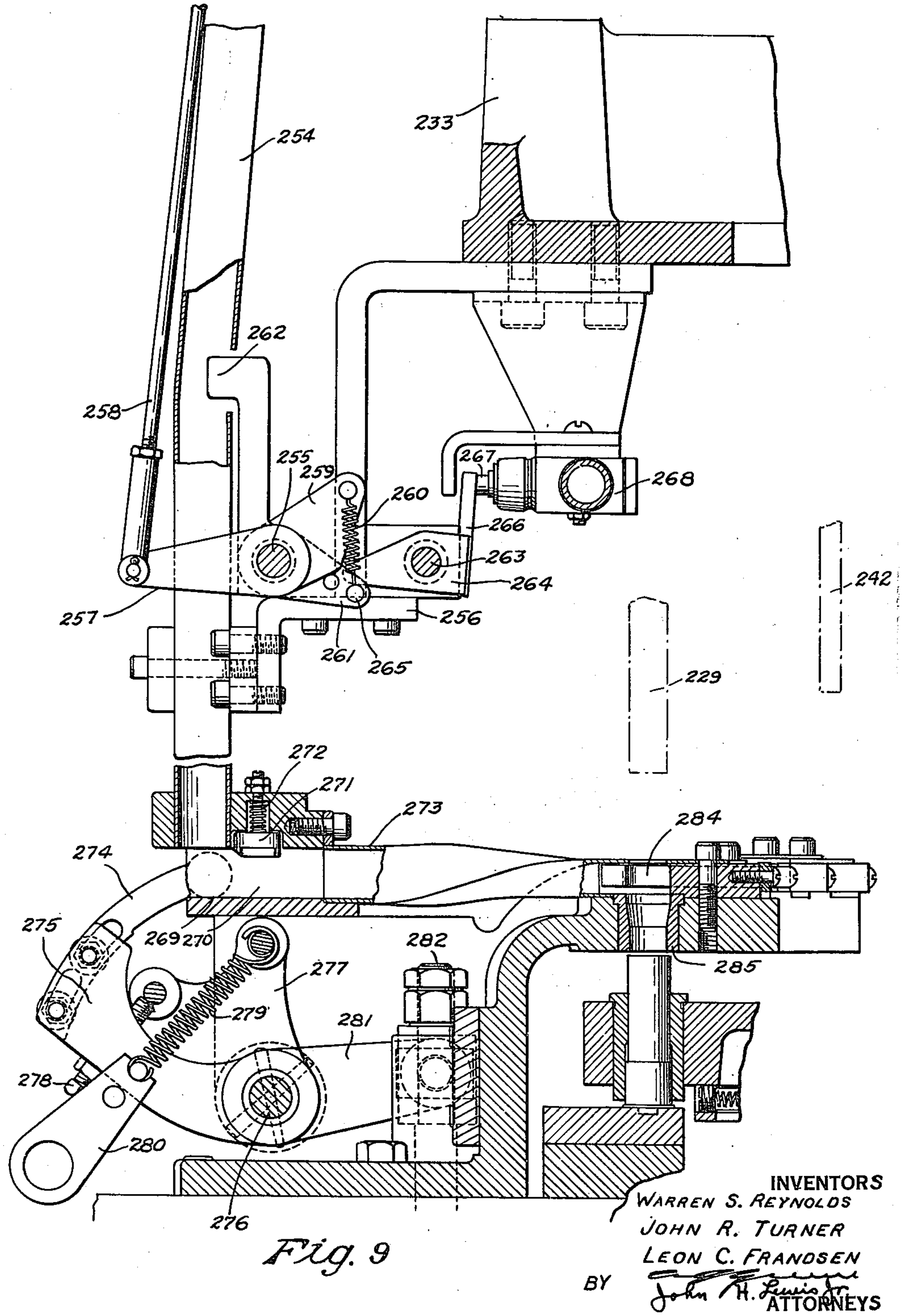
Figure 10:
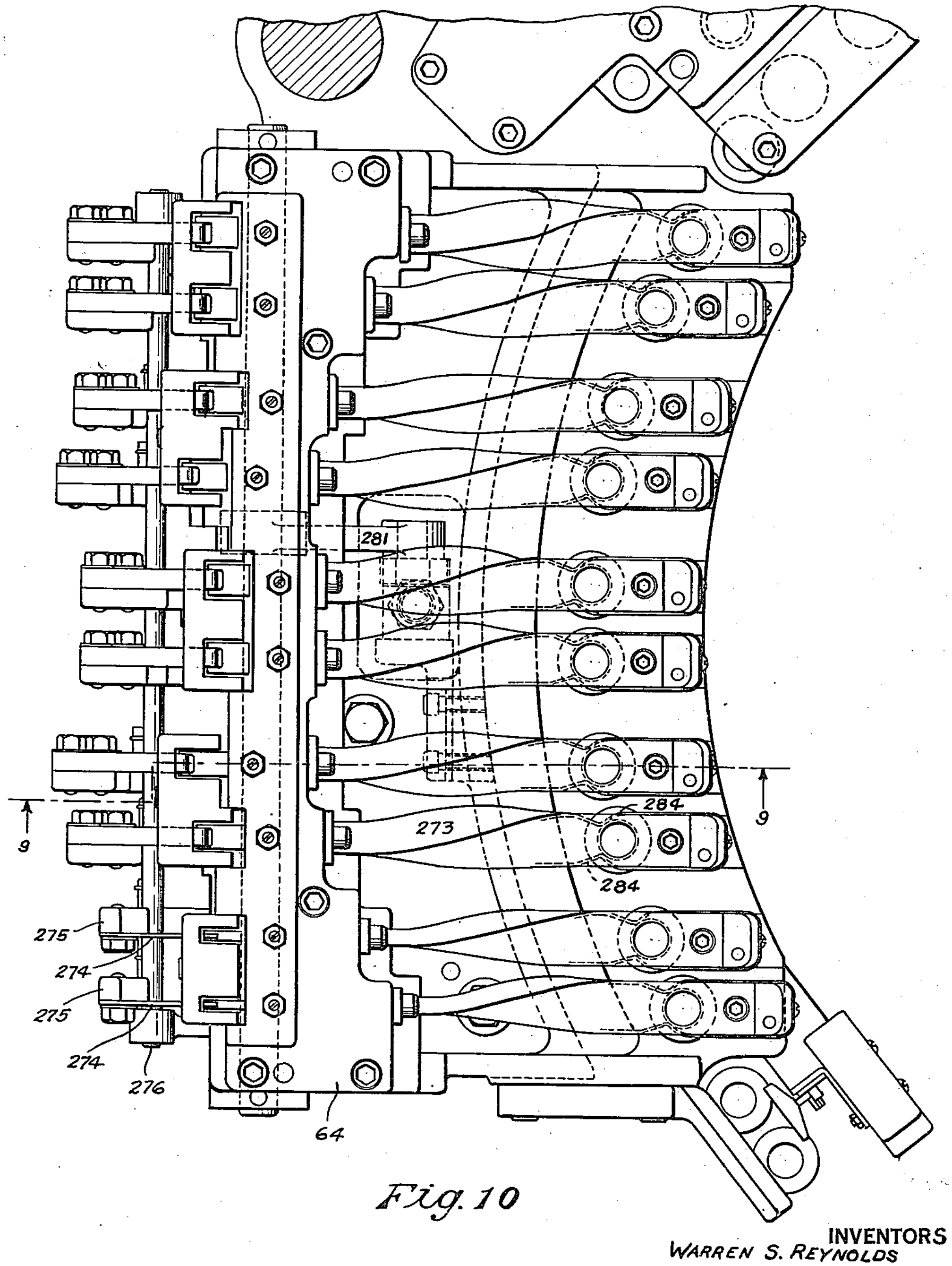

Fig. 9 is a vertical sectional view taken through one of the wad feeding stations located at 9—9 of Fig. 10.

Fig. 10 is a plan view of the overpowder and filler wad feed fixture.

Figures 11, 12:
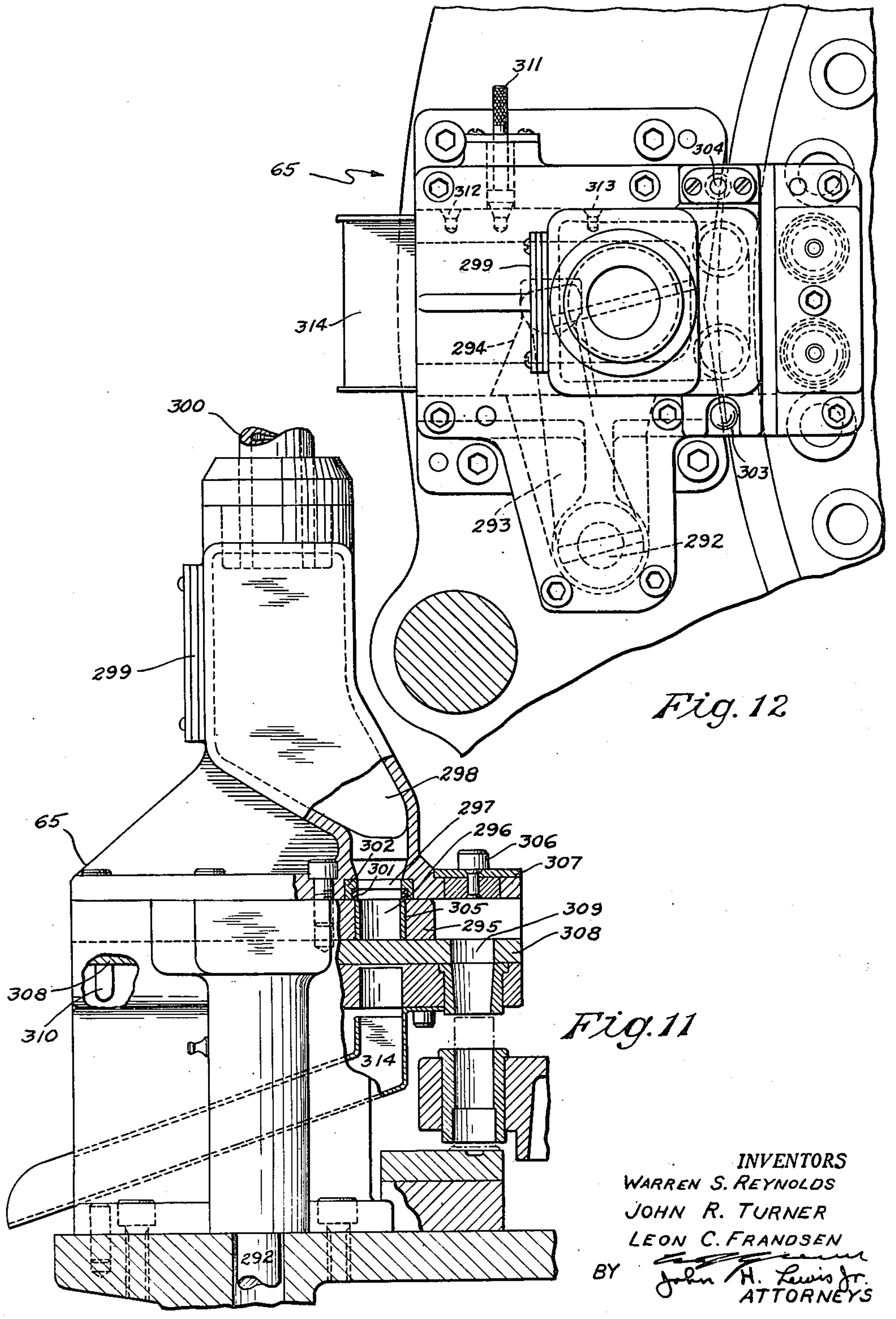

Fig. 11 is a vertical sectional view taken through the shot charging fixture.

Fig. 12 is a plan view of the shot charging fixture.

Figures 13, 14, 18, 19:
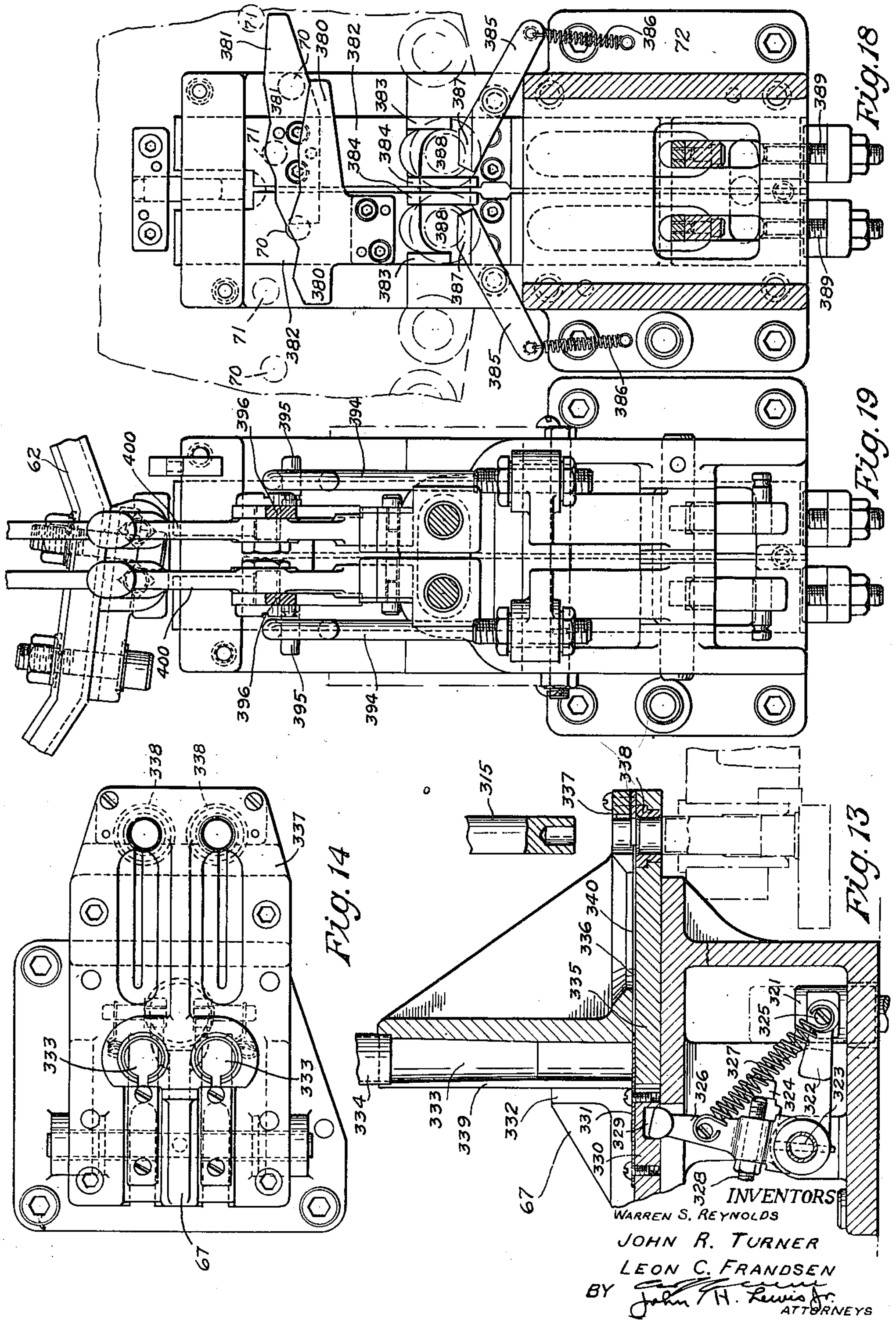

Fig. 13 is a vertical sectional view through the top wad feed fixture.

Fig. 14 is a plan view of the top wad feed fixture.

Figure 15:
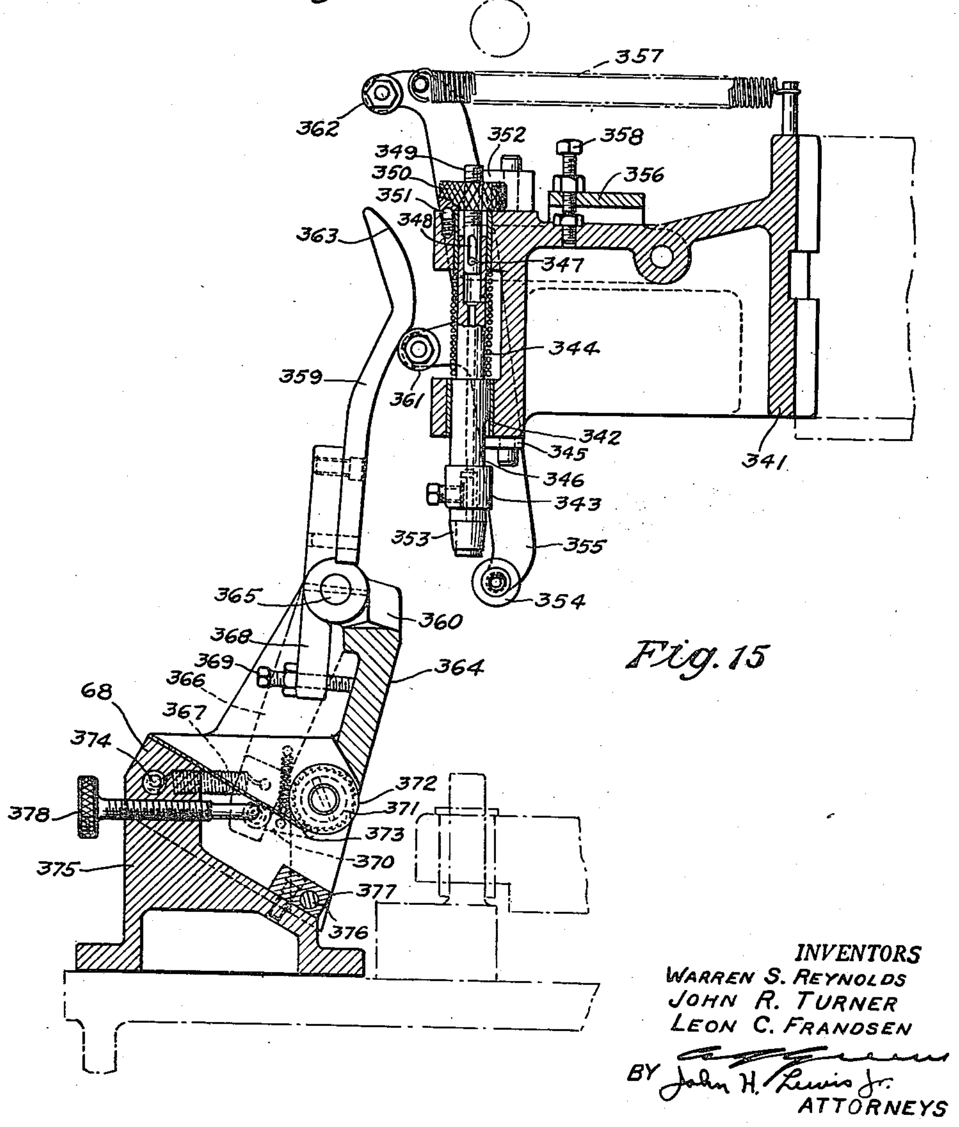

Fig. 15 is a vertical sectional view through the closure printing fixture.

Figure 16:
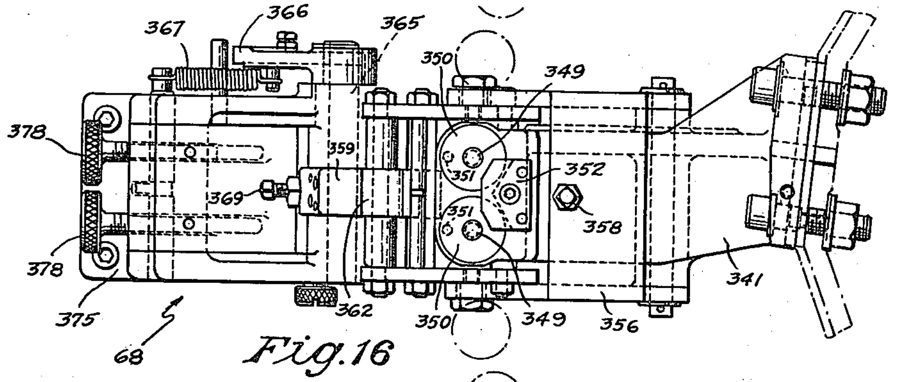

Fig. 16 is a plan view of the printing fixture.

Figure 17:
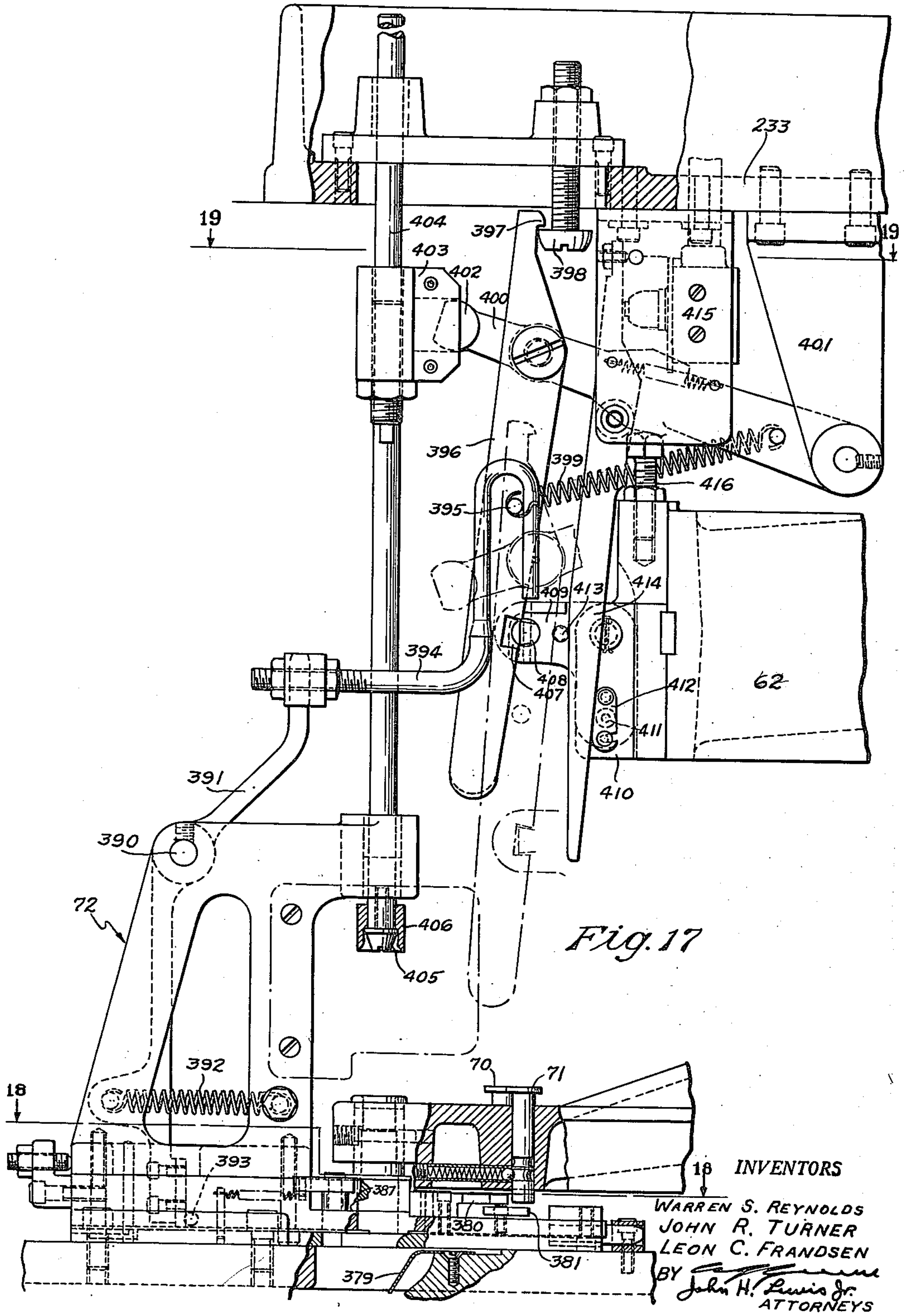

Fig. 17 is an elevational view, partially in section, showing the reject mechanism.

Fig. 18 is a horizontal sectional view on the line 18—18 of Fig. 17, showing the slide operating means at the reject station.

Fig. 19 is a horizontal sectional view on the line 19—19 of Fig. 17, showing the reject punch mechanism.

Figures 20, 21:
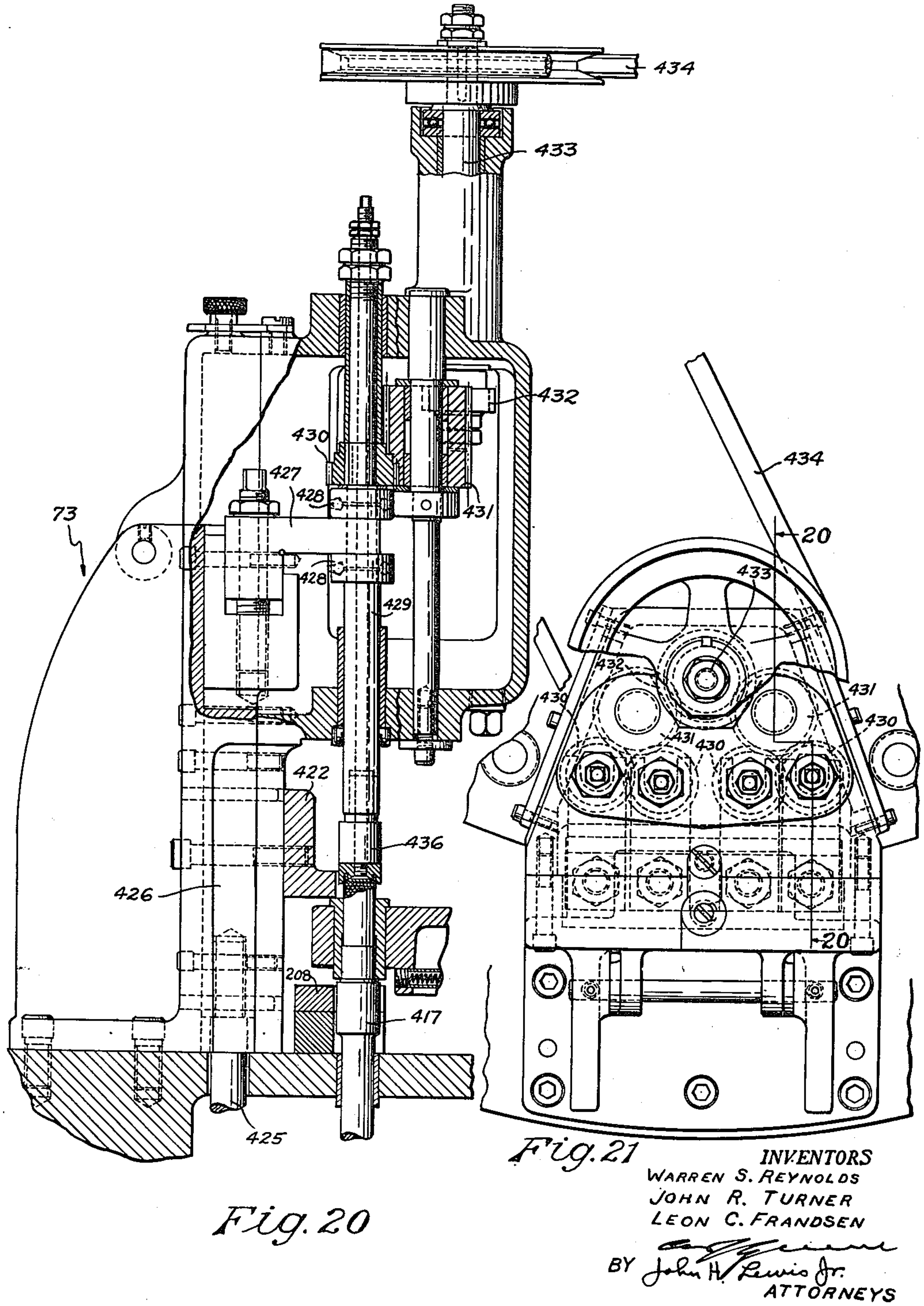

Fig. 20 is a vertical sectional view through the crimping fixture on the line 20—20 of Fig. 21.

Fig. 21 is a plan view of the crimping fixture, partially in section.

Figures 22, 23, 26, 27:
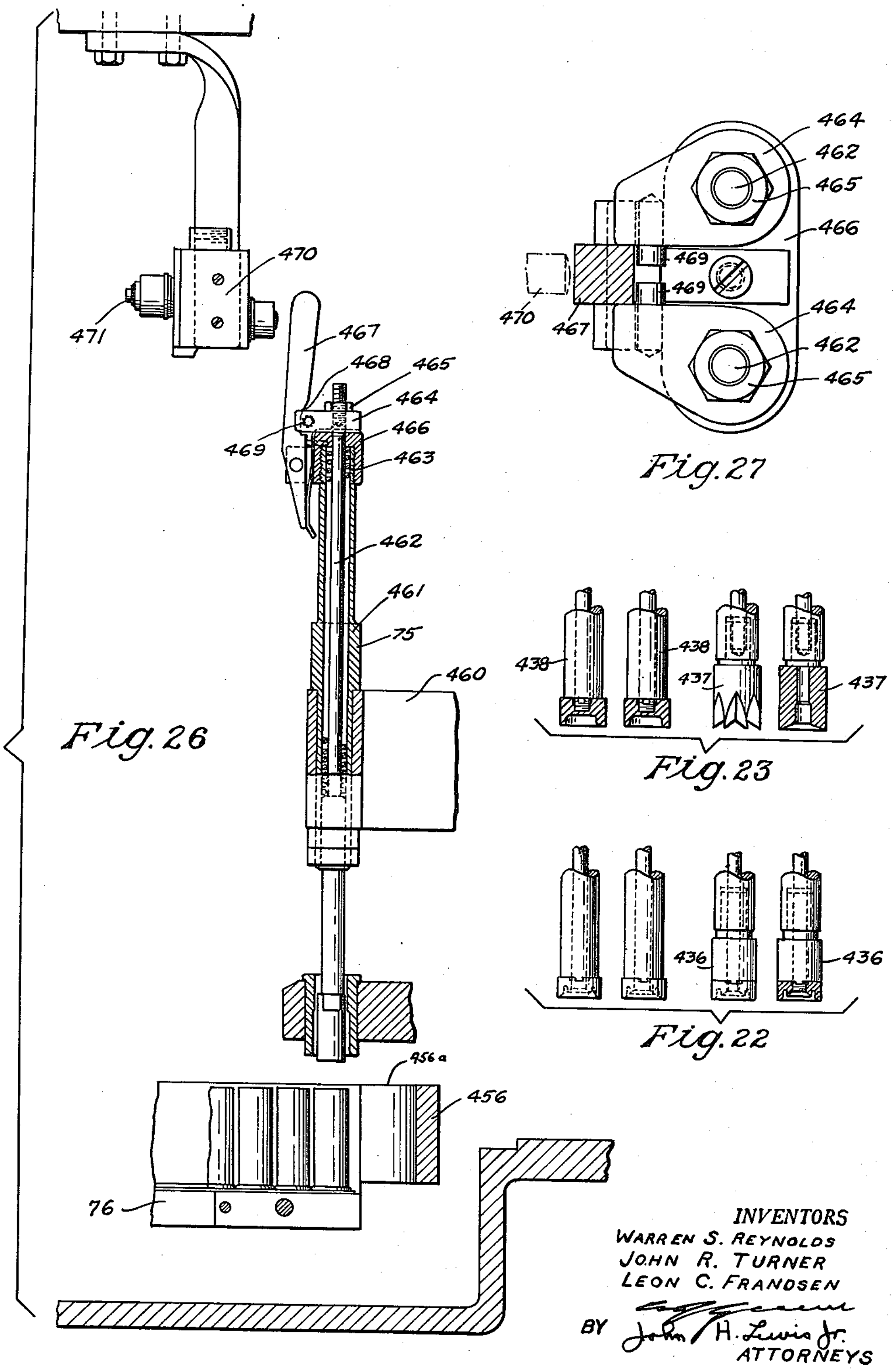

Fig. 22 is a partial sectional view on the line 22—22 of Fig. 21, showing the tool layout for roll crimp shells.

Fig. 23 is a partial sectional view similar to Fig. 22, illustrating the tool layout for the wadless closure previously referred to.

Figure 24:
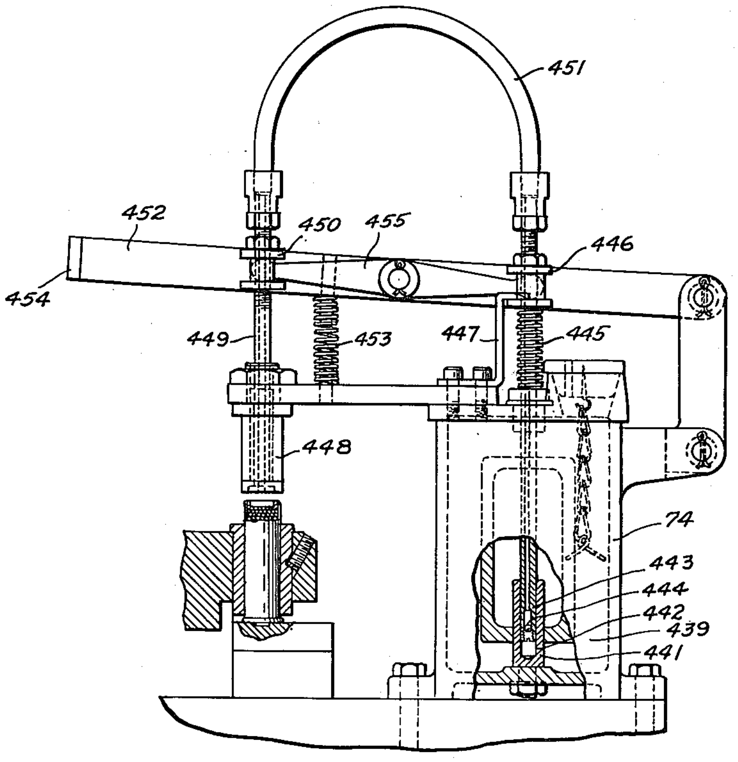

Fig. 24 is a side elevation partially in section, showing a waterproofing fixture for roll crimp shells.

Figure 25:
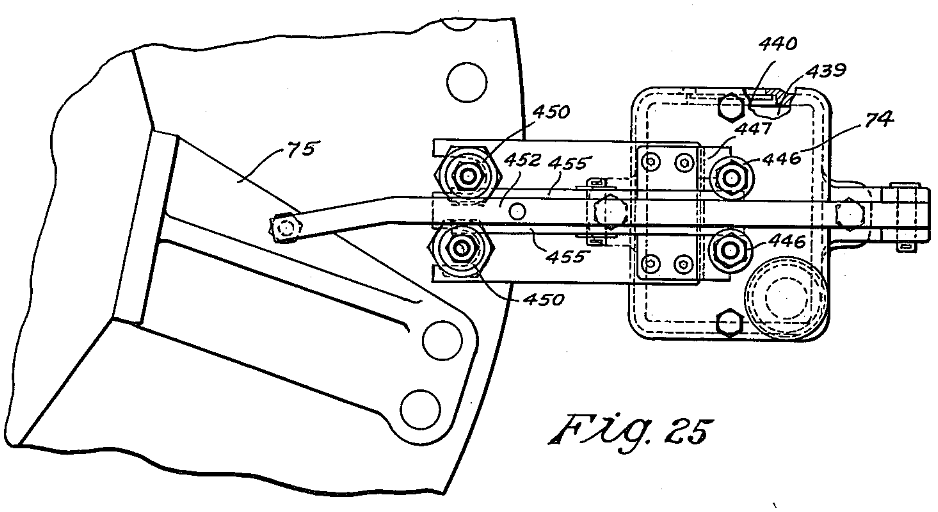

Fig. 25 is a plan view of the waterproofing fixture shown in Fig. 24.

Fig. 26 is a vertical sectional view showing the finished shell ejecting fixture.

Fig. 27 is a plan view partially in section on the line 27—27 of Fig. 26, showing in more detail the arrangement for operating the machine stop switch in the event of a failure to properly eject the finished shell.

Figures 28, 29:
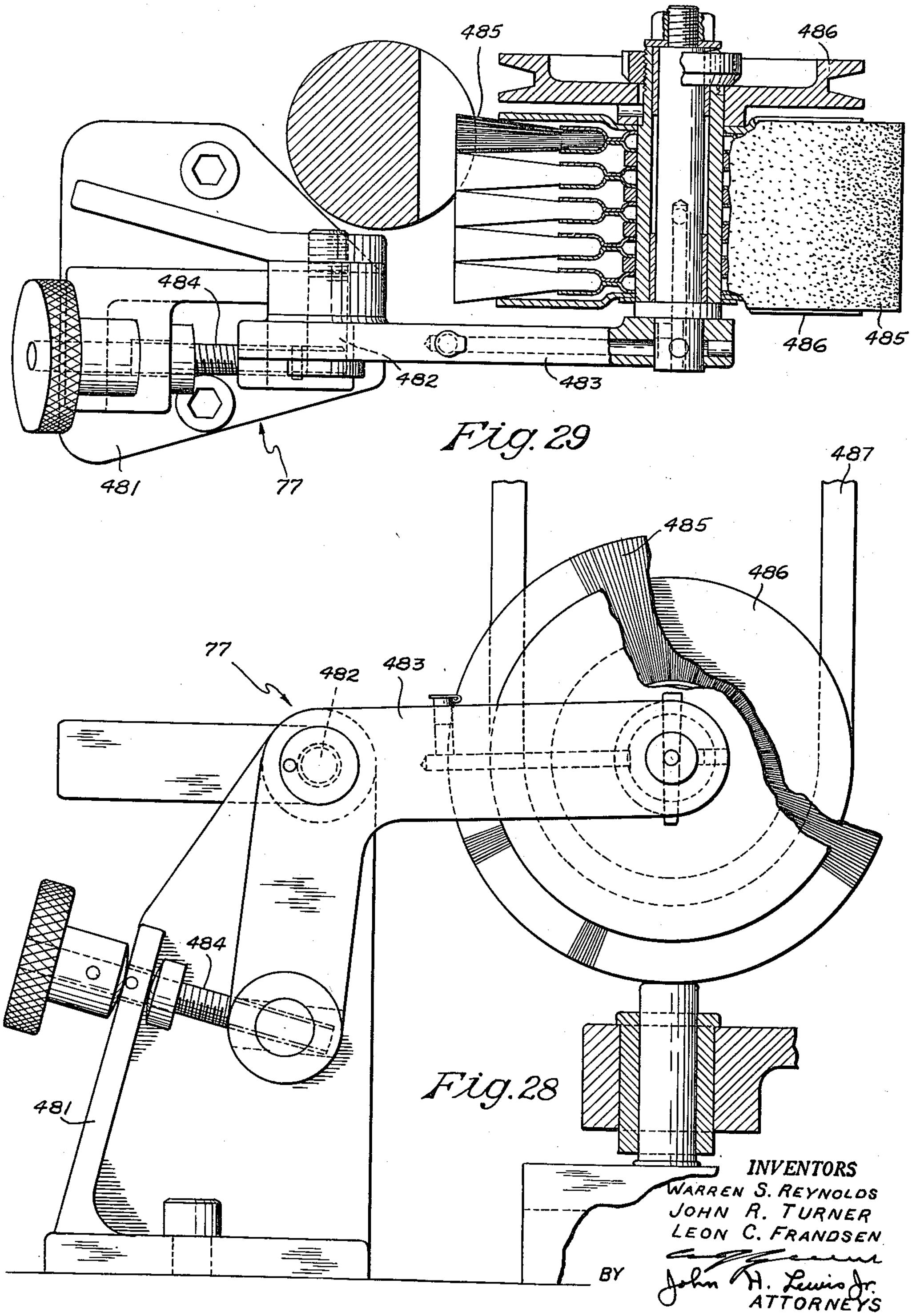

Fig. 28 is a side elevational view of the mechanism for abrading the top of a wadless closure preliminary to finishing thereof.

Fig. 29 is a plan view partially in section corresponding to Fig. 28.

Figure 30:
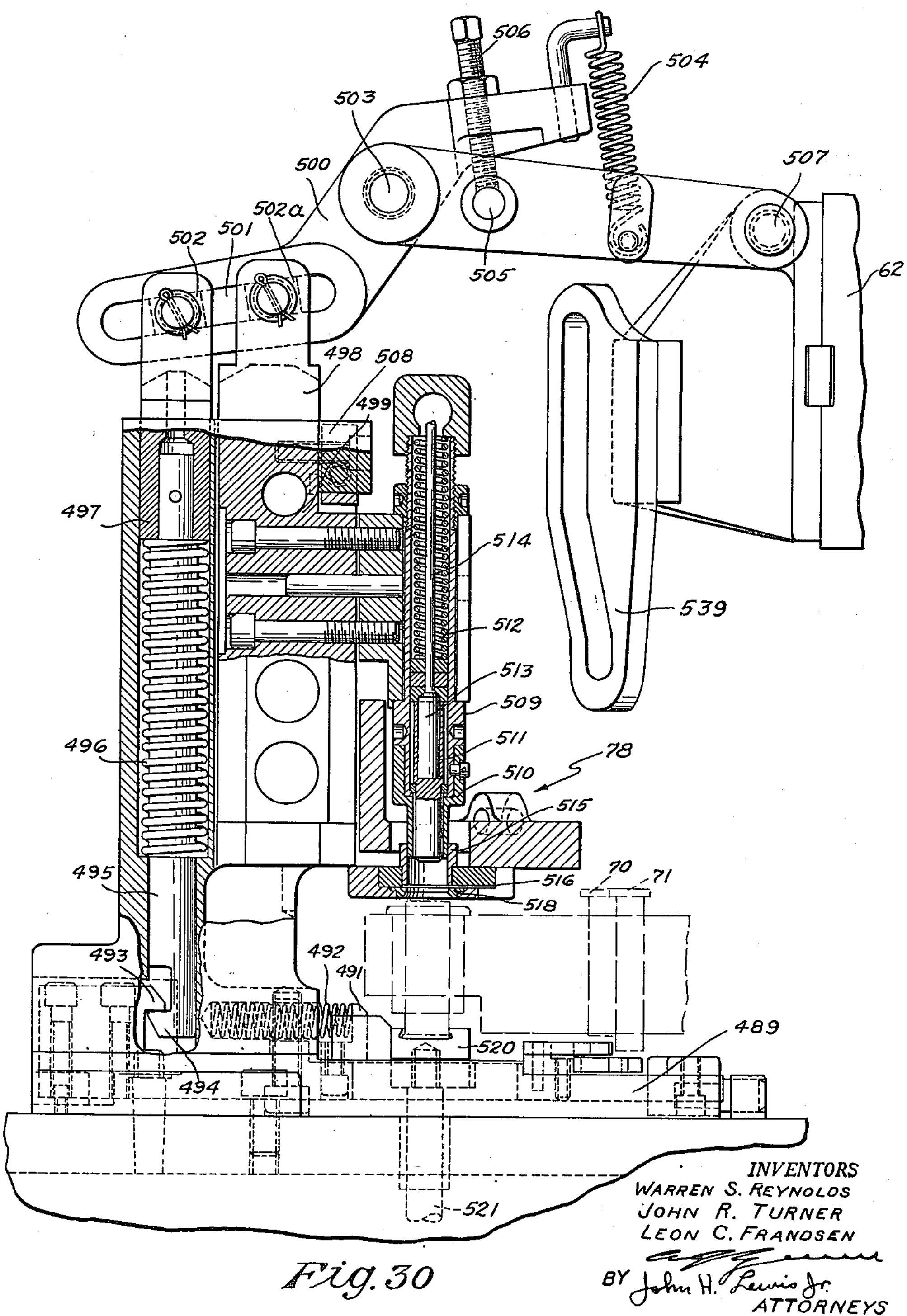

Fig. 30 is a vertical sectional view of the seal cutting and placing mechanism for the wadless closure.

Figure 31:
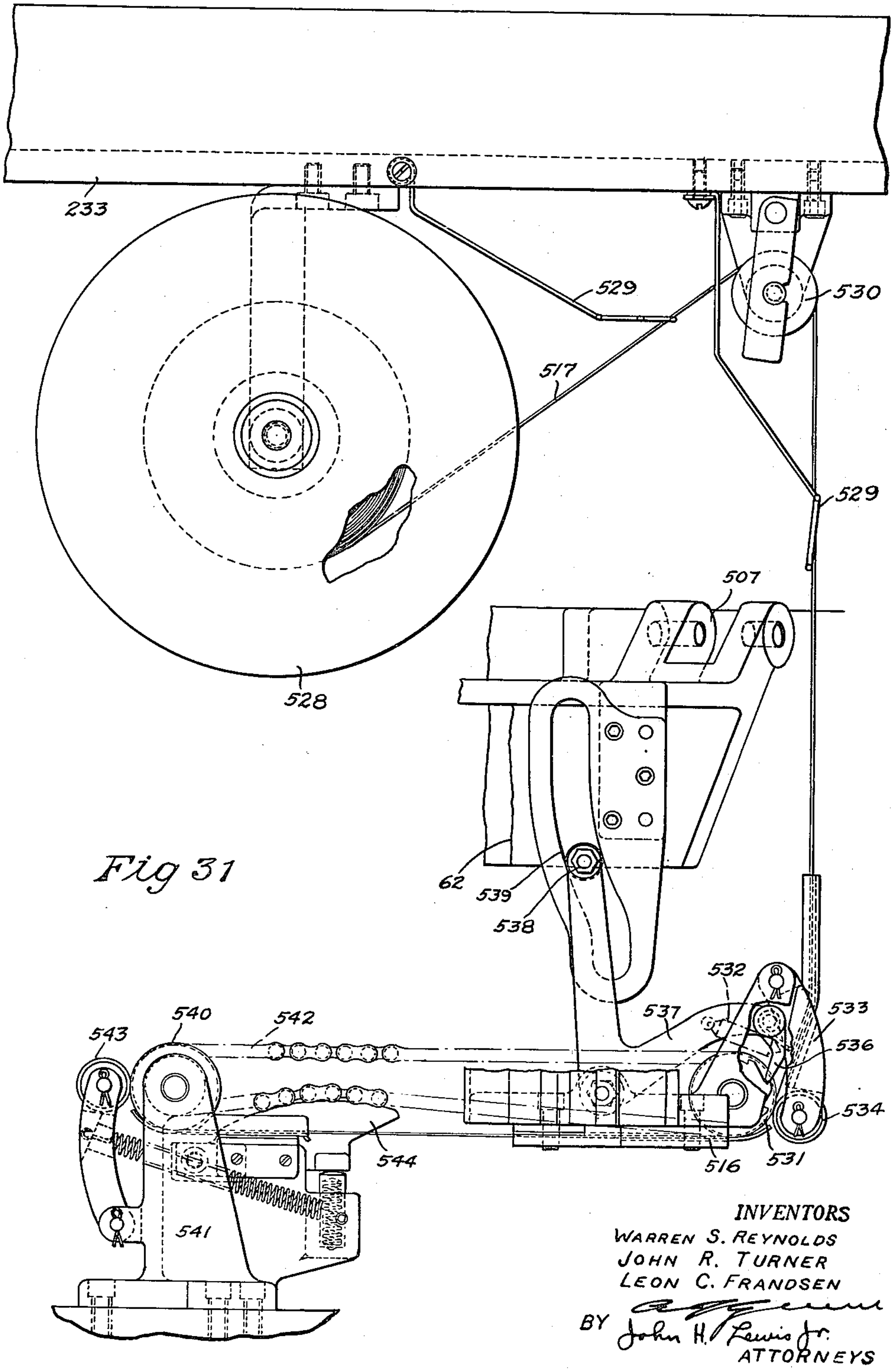

Fig. 31 is a side elevational view of the paper feed for the mechanism shown in Fig. 30.

Figure 32:
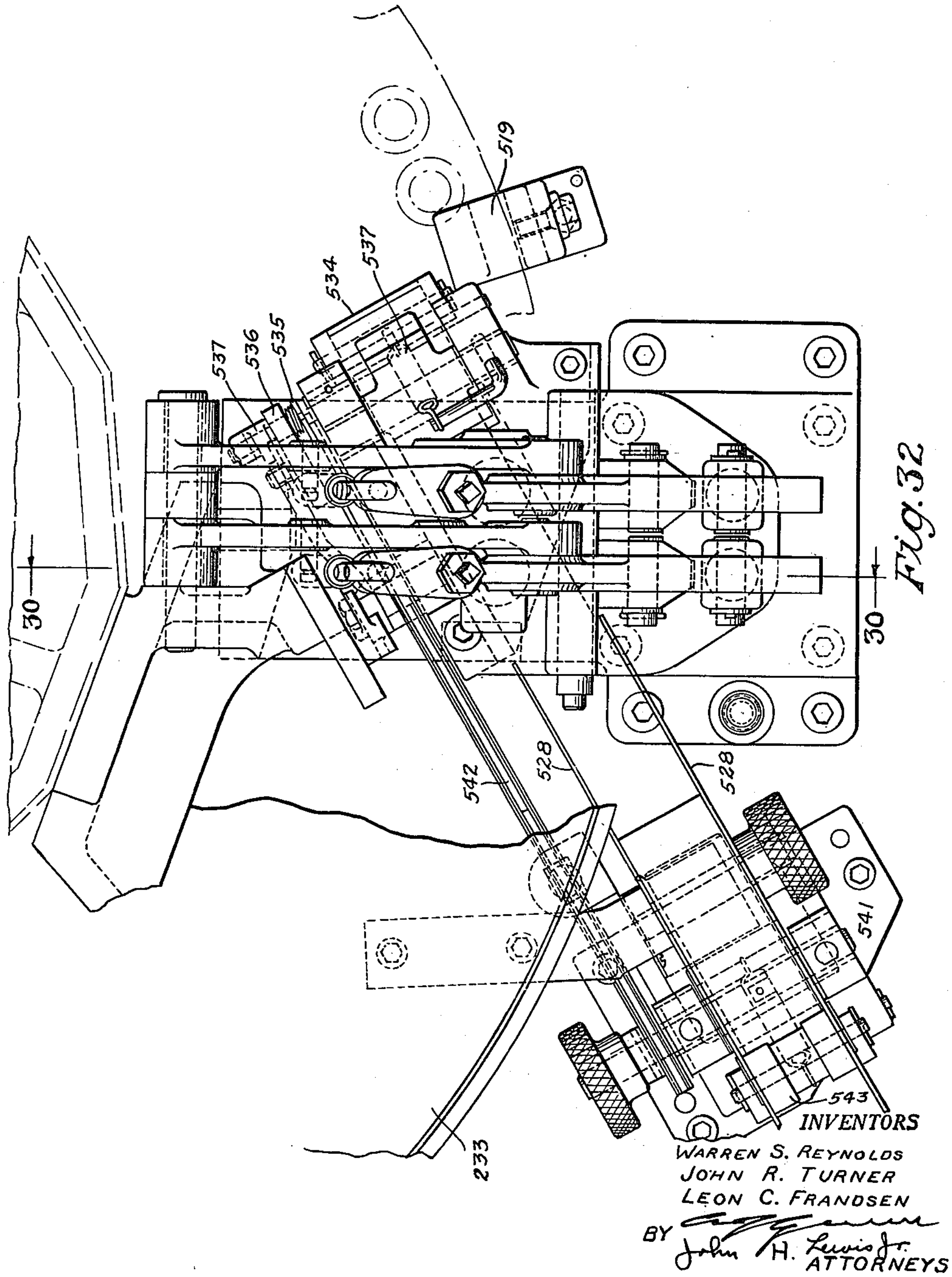

Fig. 32 is a plan view of the assembly of paper feed and seal placing mechanism shown individually in Figs. 30 and 31.

Figure 33:
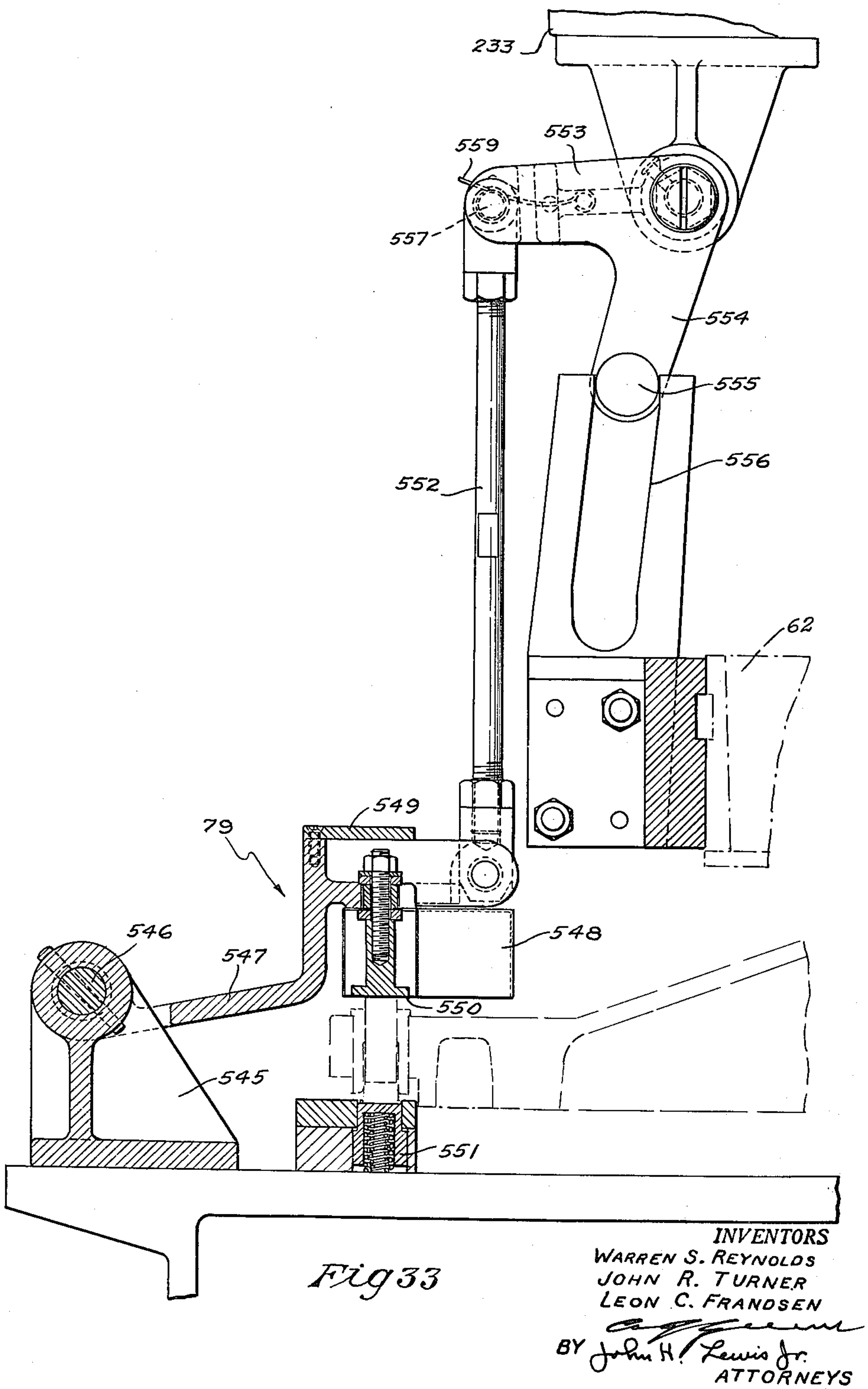

Fig. 33 is a vertical sectional view showing the actuating means for the seal heating and pressing unit.

Figure 34:
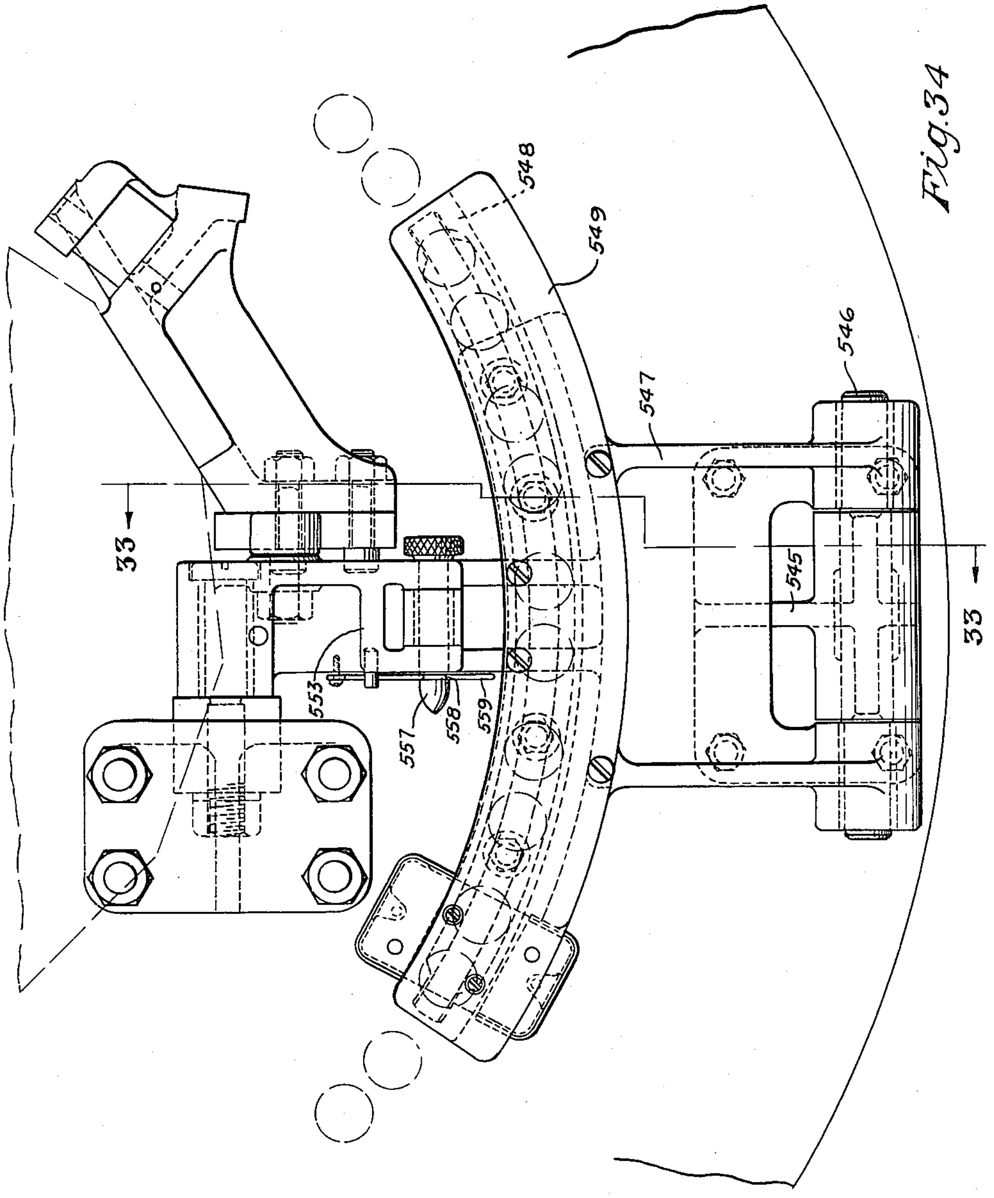

Fig. 34 is a plan view of the seal heating and pressing unit.

Figure 35:
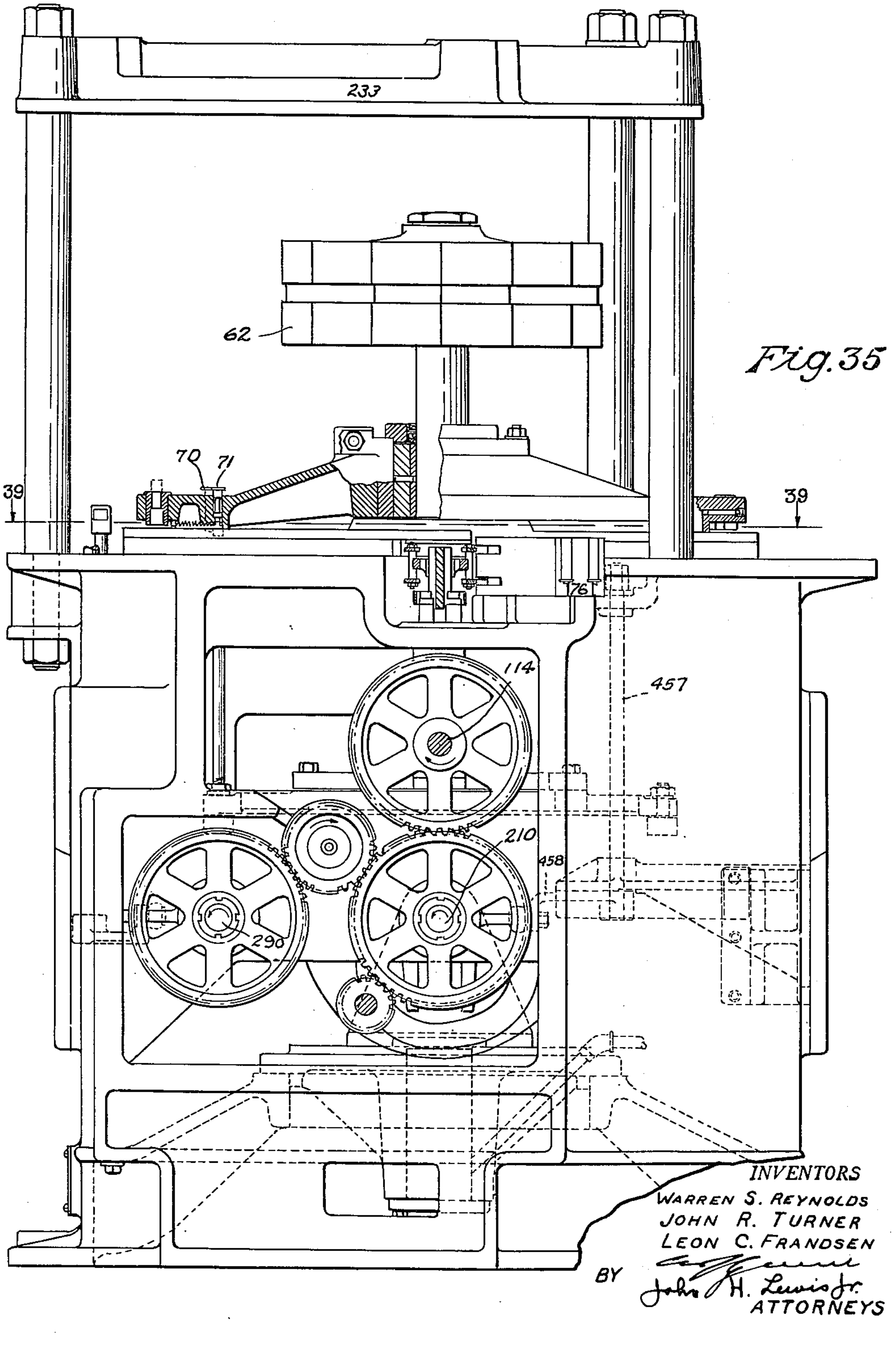

Fig. 35 is a front elevational view of the base of the machine with the straight line portion removed therefrom. The location is shown by the line 35—35 of Fig. 38.

Figure 36:
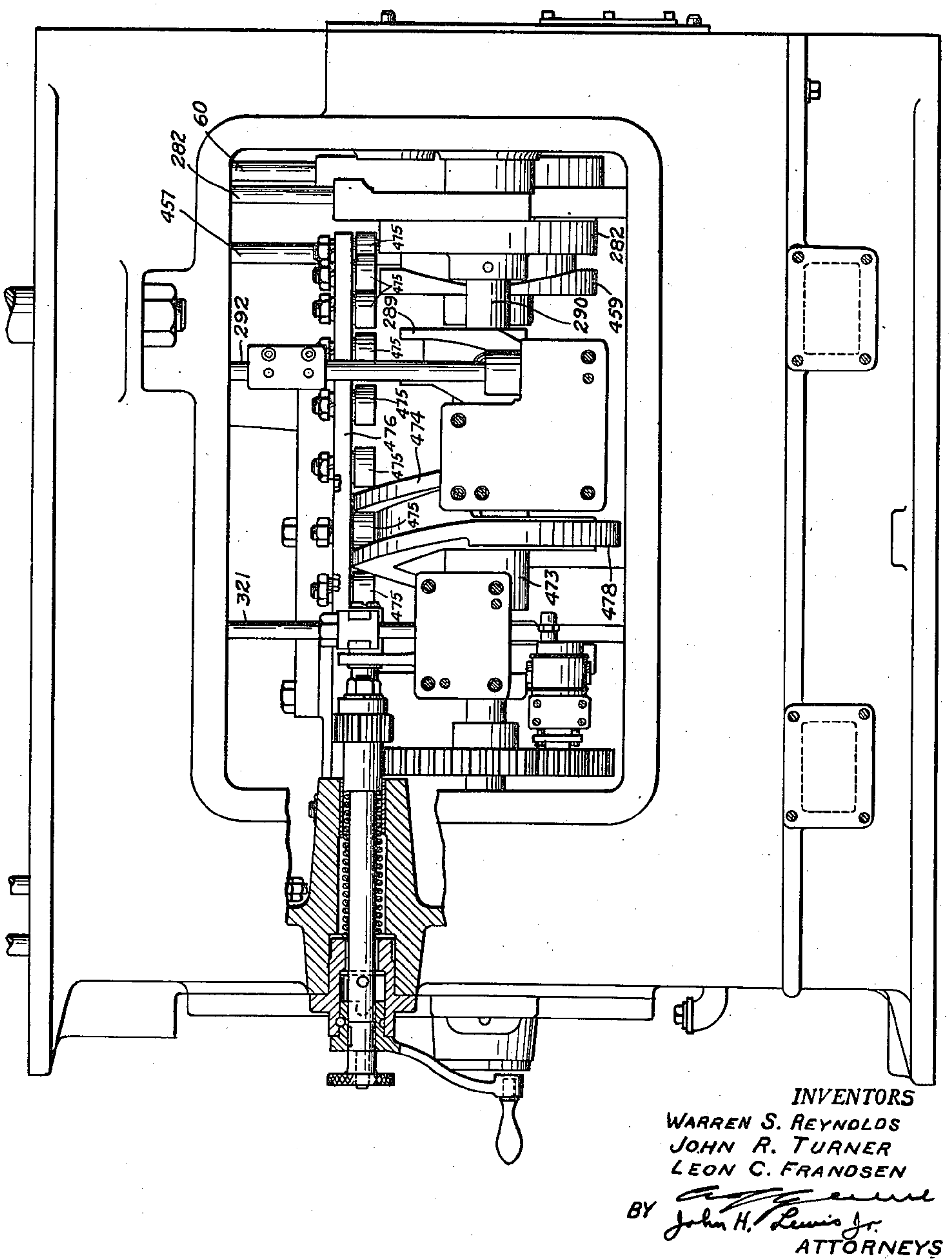
Figure 38:
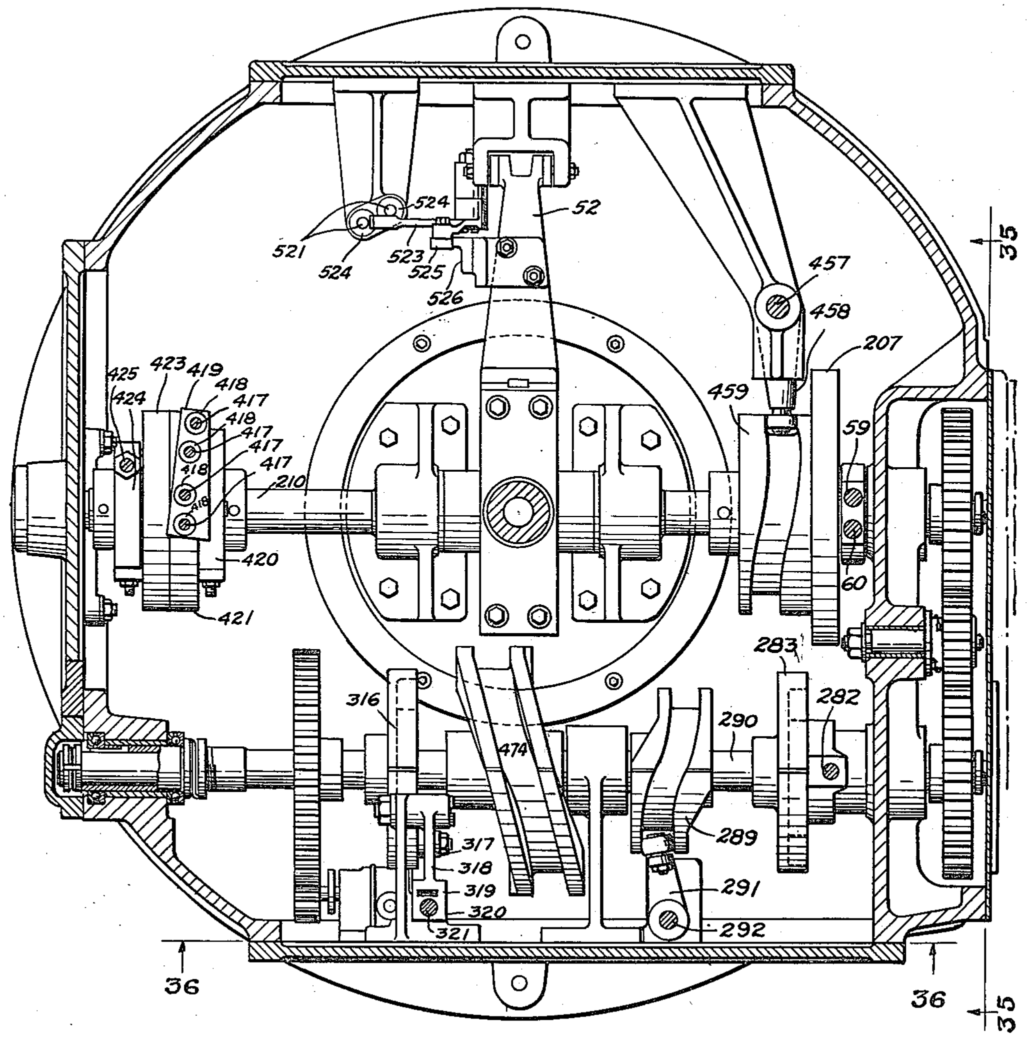

Fig. 36 is a left side elevational view of the base of the machine taken at a right angle to Fig. 35 on the line 36—36 of Fig. 38.

Figure 37:
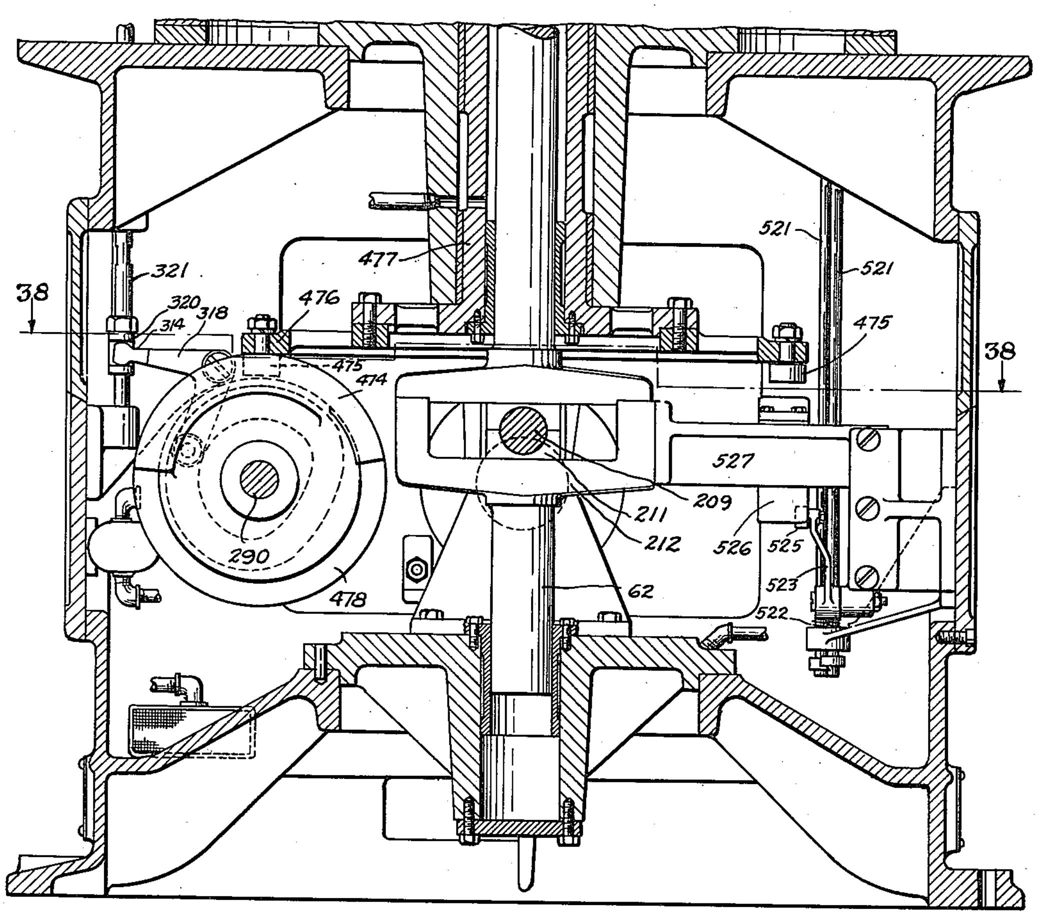

Fig. 37 is a vertical sectional view of the base of the machine on the line 37—37 of Fig. 38.

Fig. 38 is a horizontal sectional view of the base of the machine on the line 38—38 of Fig. 37.

Figure 39:
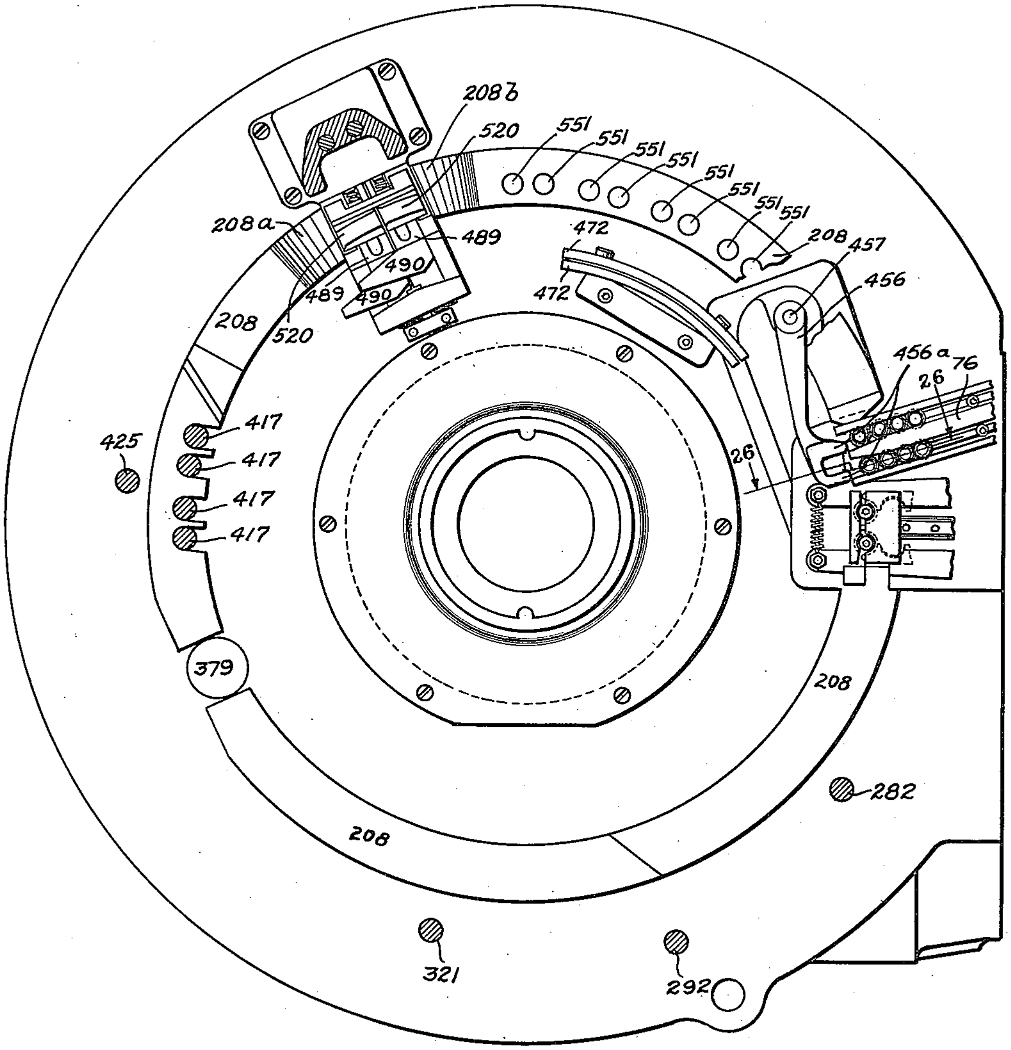

Fig. 39 is a top plan view of the base of the machine taken just beneath the dial on the line 39—39 of Fig. 35.

Figure 40:
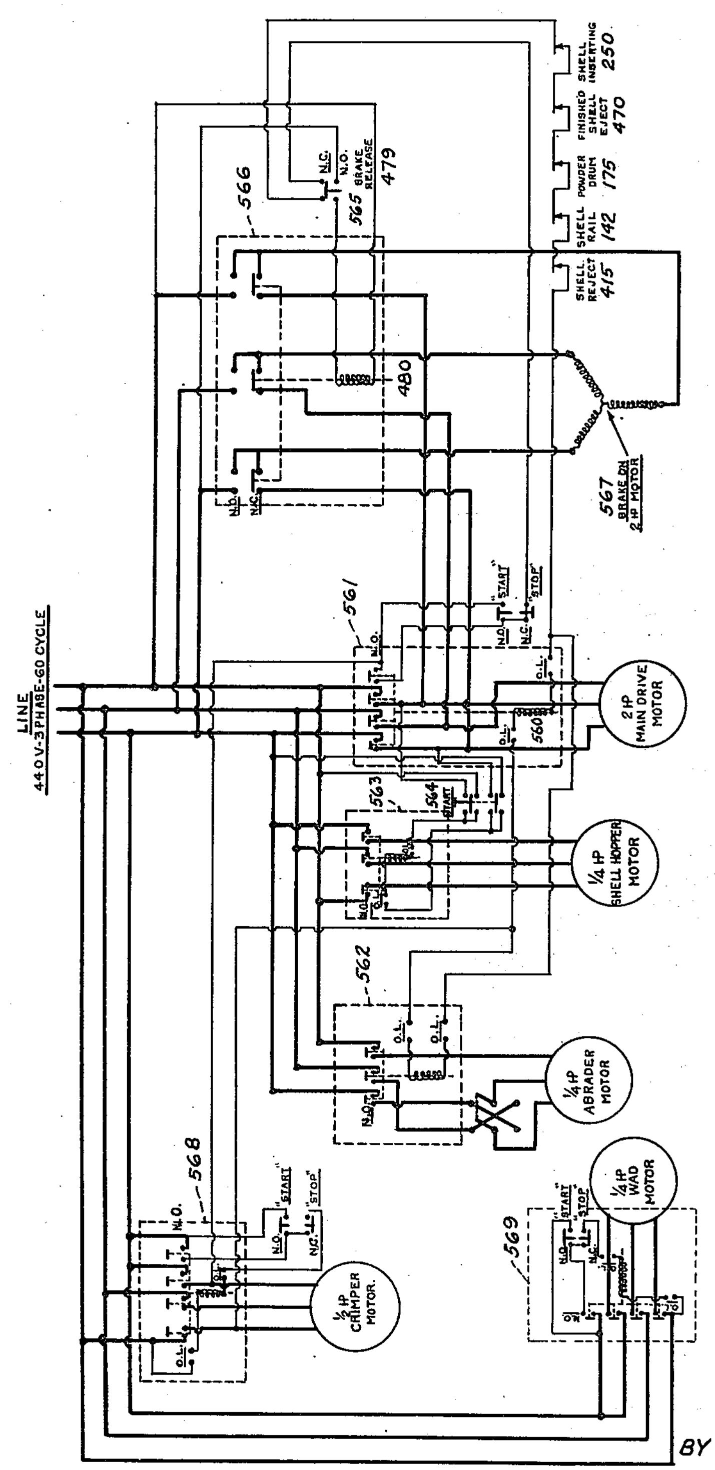

Fig. 40 is a schematic diagram showing the electrical circuits associated with the machine.

Figure 1:
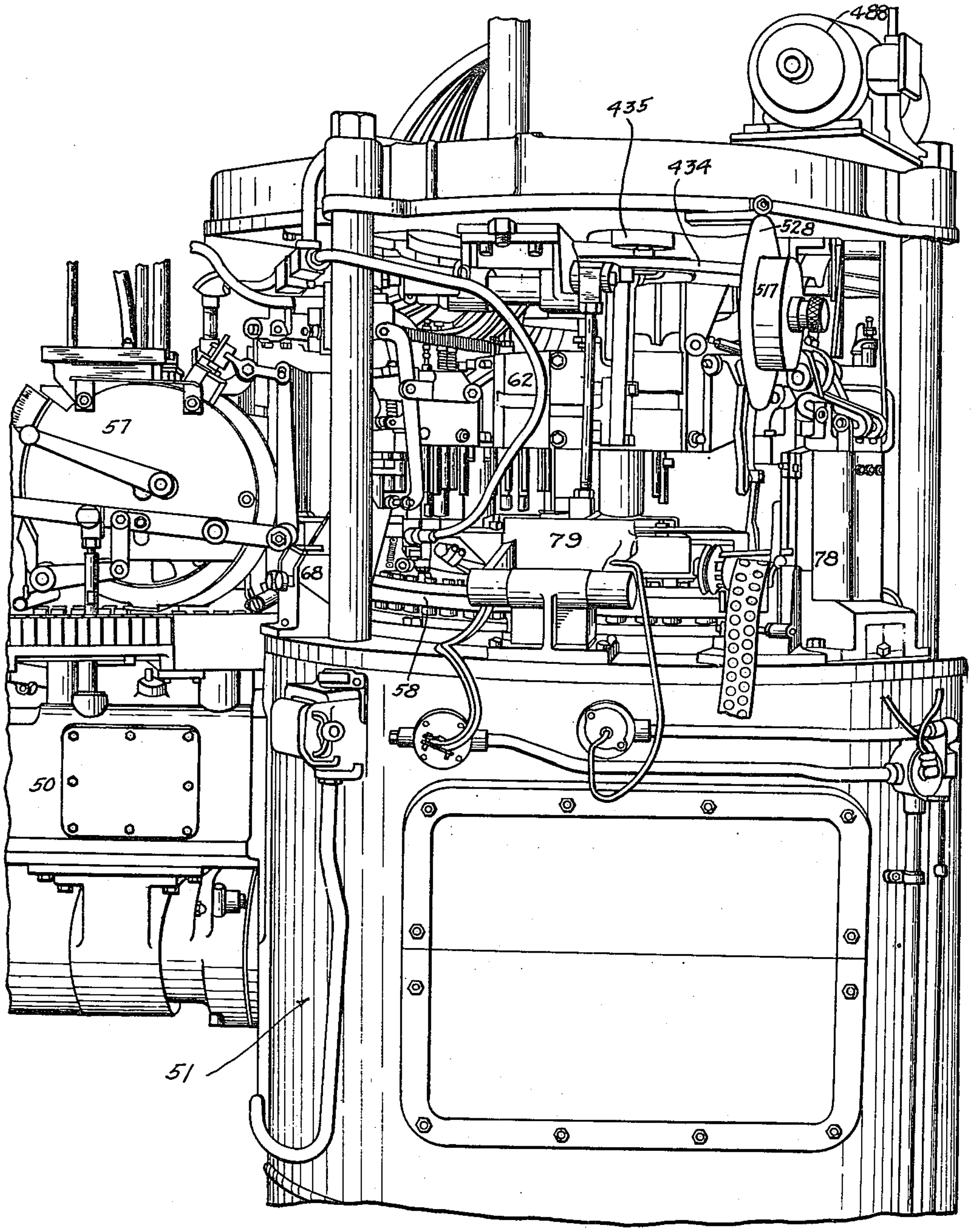
Fig. 1 is a perspective view of the completely assembled machine.
Figure 2:
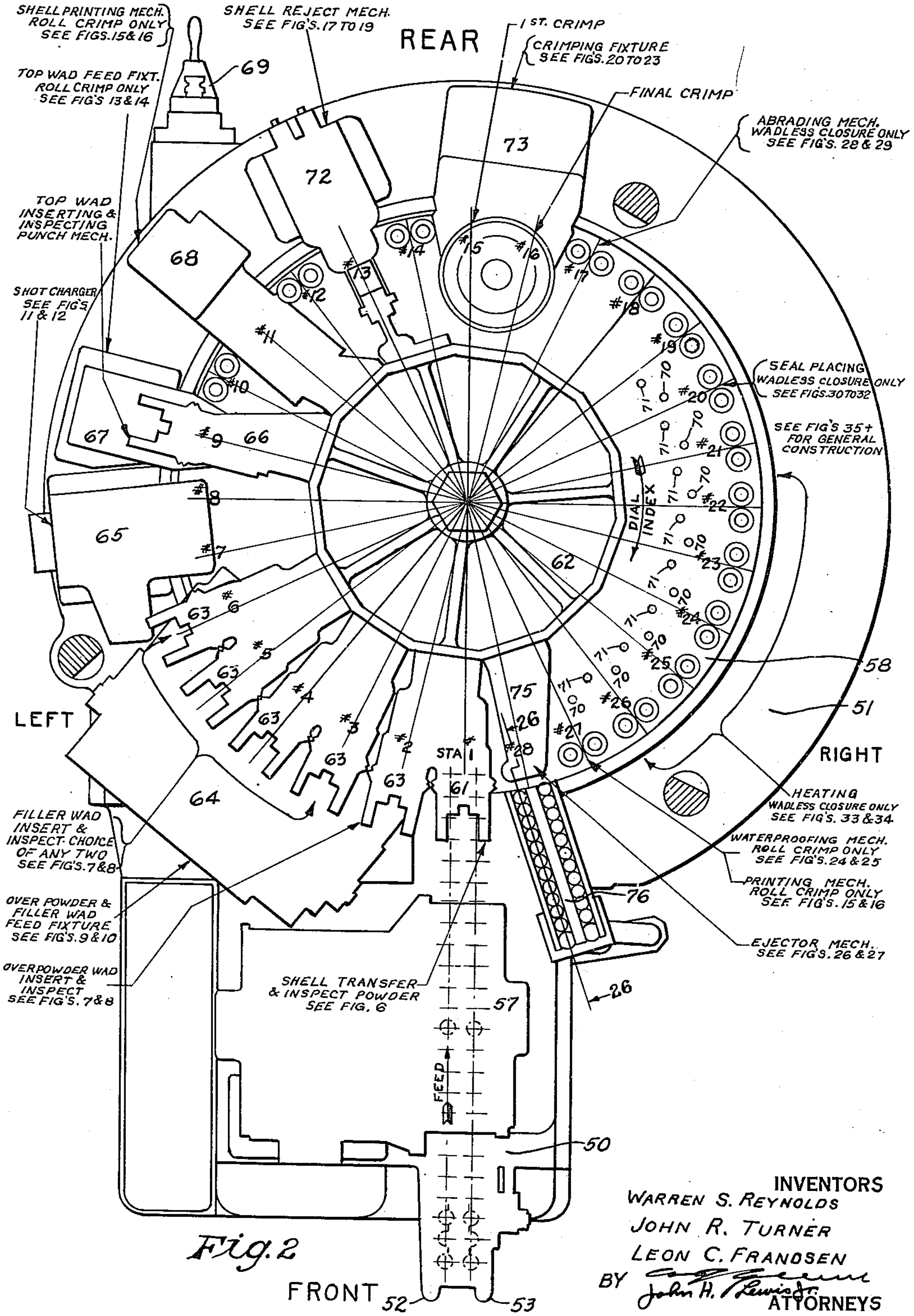
Fig. 2 is a schematic plan view illustrating the relative location of the various operating stations.

In order to gain a preliminary general understanding of the operation of the machine, reference may be had to Figs. 1 and 2 which disclose that the machine comprises two main units, a straight line feed portion indicated generally as 50, and an indexing dial portion indicated generally as 51. The machine may be called a duplex machine for shells are positioned in pairs at each of the successive operating stations and each shell of the pair is operated on simultaneously.

Figure 3:
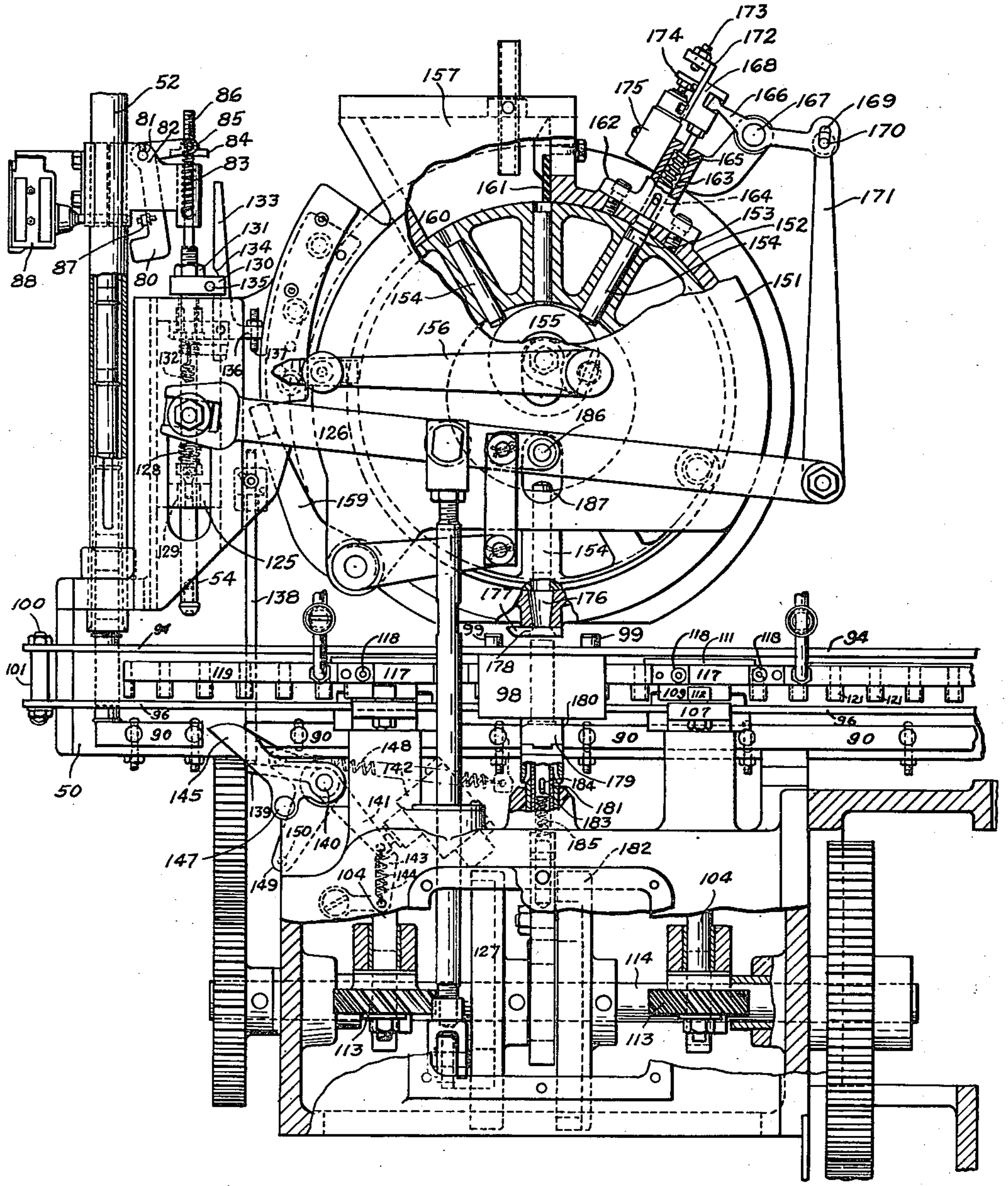
Fig. 3 is a side elevational view showing the straight line feed and powder charger.
Figure 4:
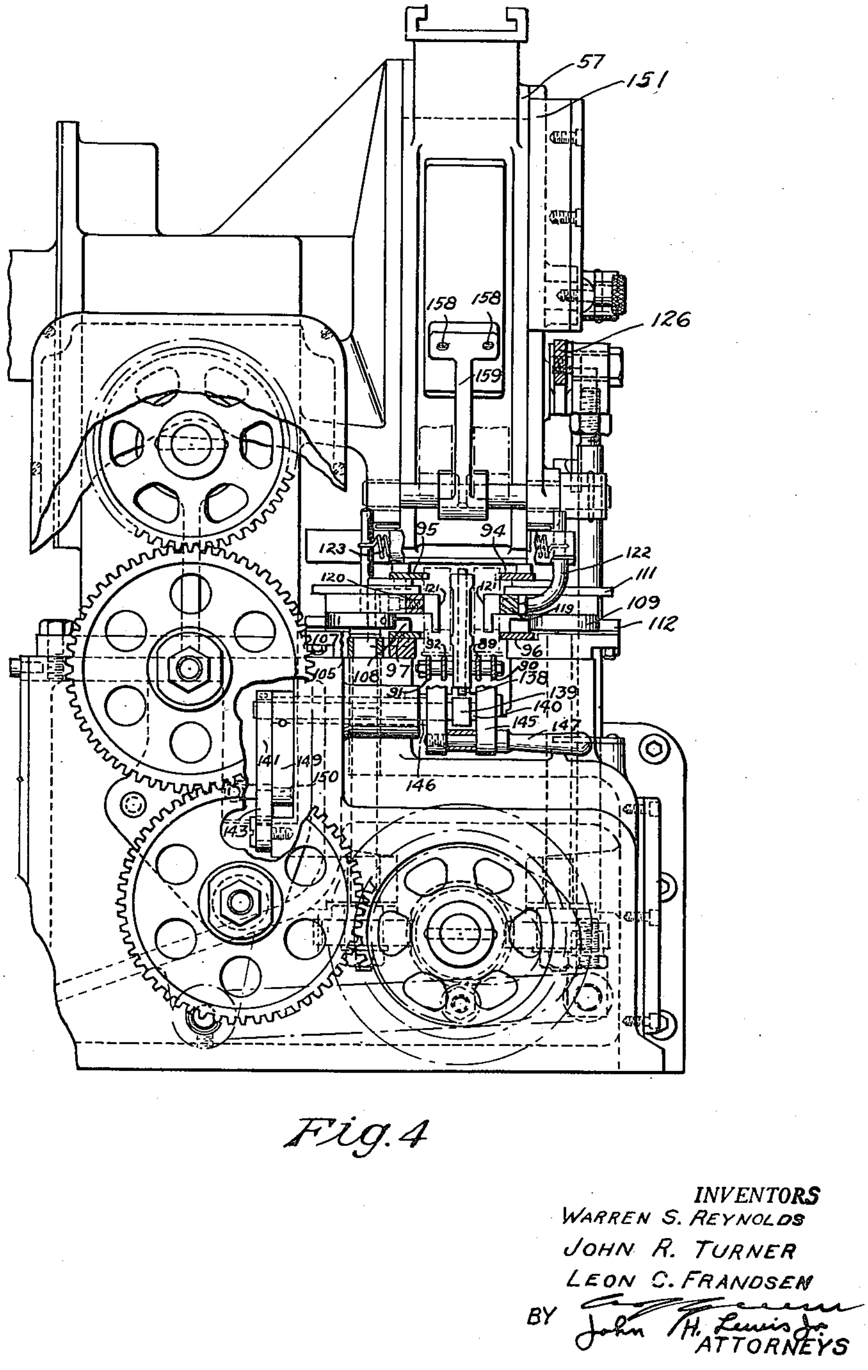
Fig. 4 is an end elevational view of the mechanism shown in Fig. 3 partially in section on the line 4—4 of Fig. 3.

Empty primed shot shells are fed by suitable means not shown, to the delivery tubes 52 and 53 at the front of the machine which convey them mouth-up to the straight line feed mechanism 50, which, in turn, conveys them horizontally to the back by a series of successive advances. Reference may be made to Figs. 3, 4, and 5 for details. In the straight line feed an inspection operation is performed by punches 54 and 55 to determine that the shell is present and free from foreign material. In the event of any irregularity, a switch is operated to stop the machine and the defective or missing shell is replaced through the gate 56. Continued operation of the straight line feed positions the pairs of shells successively beneath the delivery openings of a powder charger 57, which is in general a duplex form of the machine illustrated in Reynolds Patent No. 2,345,885, issued April 4, 1944. The powder charger deposits in each shell a precisely measured quantity of powder and the continued operation of the straight line feed delivers the pairs of powder charged shells at dial station #1 beneath a pair of suitably spaced pockets in the dial 58 which is moved in synchronism with the straight line feed. As a pair of shells come to rest beneath the dial which is momentarily stationary, they are thrust upward by transfer punches 59 and 60 into the pockets of the dial. While supported in these pockets partly by the transfer punches and partly by latches to be later described, an inspection head 61 (see Fig. 6) mounted on the vertically reciprocating ram 62 descends to verify that the shell has been properly positioned in the dial and contains neither too much nor too little powder. In the event a shell is missing, an electrical machine stop is actuated and in the event of an improper powder charge, mechanism is set to reject the shell at a subsequent station.

The mechanism at each of the succeeding five stations is substantially identical and has the function of inserting the necessary wads and inspecting to determine that such wads have been properly inserted and positioned. In the event of a defect, the reject mechanism referred to in the preceding paragraph is set. Figs. 7 and 8 are typical of the wad inserting and inspecting heads 63. Reference may be had to Figs. 9 and 10 for details of the filler wad feed fixture 64 which successively positions the desired filler wads over the open mouths of the shells into which they are thrust by the descent of the wad inserting and inspecting heads 63.

A shot charger 65 is positioned at stations #7 and #8 and acts to insert a measured charge of shot into the leading one of the pair of shells at station #7 and the lagging shell of the pair positioned at station #8. The shot charger is shown in detail in Figs. 11 and 12.

At station #9 a top wad inserting and inspecting head 66 substantially identical to those at stations #2 to #6 inserts the top wad and verifies not only that the top wad has been properly positioned but also that the proper amount of shot has been measured into the shell. In the event that the machine is set up for the more modern wadless closure already referred to, the operation at this station is simply one of inspecting for the proper shot charge. The top wad feeding fixture 67, shown in Figs. 13 and 14, is mounted at this station to feed top wads into place over the shell mouth. This fixture is removed or disabled when the machine is set up for the wadless closure.

Station #10 may be left blank and at station #11 a printing fixture 68 shown in Figs. 15 and 16 serves to print the load identifying data on the top wad. With the machine set up for a wadless closure this station is left blank and the printing fixture is installed at station #27 to print on the seal disk.

Substantially in line with station #12, it will be noted that a crank 69 extends from the base of the machine. This crank is installed to permit turning the machine over slowly by hand when making necessary adjustments to the tools at any of the operating stations.

It was previously noted that in the event of a defect in the loading of any particular shell, one or more of the inspecting heads would operate to set reject mechanism. This mechanism includes reject pins 70 and 71 positioned in the dial opposite each shell carrying pocket. Normally, these pins project above the dial and do not extend materially below the lower surface thereof. The operation of an inspection head sets the pin for a defective shell by pushing it down until it extends below the face of the dial. At station #13 any reject pin which may have been set contacts an actuator for a reject fixture 72 shown in Figs. 17, 18 and 19, which removes the support from beneath the defective shell and simultaneously releases a reject plunger to positively clear the shell from the dial.

At stations #15 and #16 there is located the crimping fixture 73 shown in Figs. 20 and 21 which, in two steps, forms the conventional roll crimp against the top wad or with the change of tools from those shown in Fig. 22 to those shown in Fig. 23, folds in the end, and irons it down in the modern wadless closure.

For roll crimp operations the stations between the crimping fixture and station #27 are idle. At the latter station there may be installed a waterproofing fixture 74 shown in Figs. 24 and 25 which meters a small quantity of a lacquer or other waterproofing material into the mouth of each roll crimp shell to seal the crimp and top wad against moisture penetration.

At station #28 the completed shell is ejected from the dial by an ejecting fixture 75 which pushes the shells downwardly out of the pockets into position to be fed into the two row track 76 leading to any suitable packing machinery.

When the machine is set up for the wadless closure, an abrading fixture 77 (Figs. 28 and 29) is mounted at station #17 to slightly roughen the end face of the closed shell and promote better adhesion of the seal disk.

A seal placing fixture 78 located at station #20 (Figs. 30, 31 and 32) is arranged to blank disks from a thermoplastically coated tape supplied in continuous rolls and by means of a heated punch to apply the seal disks to the end face of the shells. Suitable mechanism discussed in detail hereafter functions to prevent the operation of the seal placing unit whenever an empty pocket is thereunder as the result of the rejection of a defective or incomplete shell at station #13.

Stations #22 through #26 are arranged to apply heat and pressure to the seal disk and complete its adhesion to the shell by utilizing the heating fixture 79 which radiates heat to those shells thereunder and which, at each reciprocation of the ram 62, applies direct heat and steady pressure thereto. This completes the wadless crimp shell with the exception of printing the load identifying data on the seal disk. As has been previously mentioned, the printer 68 is for this purpose installed at station #27 immediately prior to the ejection station where either type of shell is ejected in the same way.

DETAILED DESCRIPTION

The detailed description will be subdivided in accordance with the functions performed by the various units and will be arranged, as above, in the order of the operations necessary to complete a roll crimp shell, with a return to those stations wherein the wadless closure requires different operations. As necessary to an understanding of the various operations, reference will be made to the interior of the base of the dial portion of the unit wherein are mounted the various cams and cranks controlling the operation of the individual units.

*Empty shell delivery and shell feeding alarm*

Referring particularly to Fig. 3, there is shown the right hand delivery tube 52 which stands immediately in front of the left hand tube 53 which is substantially identical. These tubes receive shells in a continuous line, open end up, from any of the orienting feeding devices which are commonly used in the ammunition industry. It will be appreciated that it is desirable that the operator of the machine be forewarned of any impending failure in the supply of shells to his machine. To that end each of the tubes is provided with a similar detector finger 80 pivotally mounted at 81 on a block 82 supported on the delivery tubes. Springs 83 constantly act to urge the end of the fingers to swing into the tubes through slots in the walls thereof. The tendency of the springs to swing the fingers into the tubes is overcome by a crosshead 84 which engages beneath inward extensions of the spring anchor pins 85. This crosshead is vertically reciprocated by a rod 86 and only at the lowermost part of the crosshead stroke are the fingers permitted to swing toward the center of the tube. If shells are properly filling the tube, the further movement of the finger is obstructed thereby. If either tube is not filled with shells, the corresponding finger will swing into the tube and as it does so will contact and move a switch actuating bar 87 arranged to apply pressure to the actuating button of a switch 88 which may be conveniently of the type known as a "Micro-Switch." This switch is wired in circuit with an alarm bell which warns the operator of the imminent exhaustion of his supply of empty shells. The operating rod 86 is arranged to project into the path of elements associated with the inspection punches 54 and 55 to be raised thereby when the punches are at the upper end of their stroke. The shell feed tubes extend vertically downward and terminate just above the first station of the straight line feed 50.

*Straight line transfer mechanism*

Referring to Figs. 3, 4 and 5, and most particularly to Fig. 5, it may be seen that the transfer mechanism comprises a pair of right hand track rails 89 and 90 and a matching pair of left hand track rails 91 and 92 which are arranged on opposite sides of a dividing bar 93 and extend from a point beneath the delivery tubes 52 and 53 to a point beneath the dial 58 and just short of the path of the transfer punches 59 and 60. These rails with the dividing bar form fixed elements which guide the shells through the straight line feed mechanism.

Arranged on either side of the dividing bar are holding bar assemblies comprising upper holding bars 94 and 95 and lower holding bars 96 and 97. Each upper holding bar is secured to its corresponding lower holding bar by a C-bracket 98 secured by bolts 99 to each bar of the pair substantially midway between their ends. The upper and lower bars of a pair are additionally secured to each other at their end portions by bolts 100 passing vertically through both bars and holding them in engagement with spacer bushings 101. A pair of coil springs 102 are engaged between the opposite spacer bushings and tend to draw the right and left holding bars toward each other into a position in which the holding bar fingers 103 may confine shells riding on the transfer track rails 89—90 and 91—92 against the dividing bar 93.

Four vertically arranged transfer shafts 104 are symmetrically disposed on opposite sides of the dividing bar and each shaft passes through a rectangular guide block 105. The guide blocks 105 are slidably received in elongated slots 106 in cam follower blocks 107, each of which is suitably secured as by bolts 108 to the appropriate lower holding bar, thus allowing guided right and left movement of the holding bars and positively preventing any fore and aft movement thereof. Each shaft 104 carries on its upper end a combination cam and crank which may conveniently be formed integrally and comprises a cam disk 109, a crank pin 110, and a guard disk 111. Each cam follower block 107 is provided with a follower roller 112 which rides on the periphery of the cam disk 109 controlling the extent to which the springs 102 are permitted to draw the holding bars together. Conveniently, the cam may be shaped to keep the holding bars completely out of the path of shells on the transfer rails for slightly less than half a revolution of the transfer shafts which are driven in synchronism through spiral gears 113 meshing with matching gears on an operating shaft 114 driven from the main shaft in the base of the dial portion 51.

A split guide block 115 encircles each crank pin 110 and is itself received in a slot 116 in a yoke 117 which lies between the upper face of the cam 109 and the lower face of the guard disk 111. Each yoke is suitably secured as by bolts 118 to the appropriate one of a pair of transfer bars, 119 on the right side of the dividing bar 93, and 120 on the left thereof. The transfer bars are each provided with fingers 121 spaced on the same centers as the holding bar fingers 103. Upwardly extending posts 122 are provided on the transfer bars 119 and 120 and serve to receive springs 123 tending to draw the transfer bars toward the dividing bar 93. Conveniently, the springs may be enclosed in slotted tubular guards 124.

Fig. 5*a* shows schematically the path travelled by an opposed pair of the transfer bar yokes 117, or for that matter, any other pair of oppositely disposed points on the transfer bars. Considering specifically the right hand transfer bars, it may be seen that the right hand shafts rotate in a clockwise direction as viewed in Figs. 5 and 5*a*. Picking up the cycle at approximately 3 o'clock on an imaginary clock dial, which is the position shown in Fig. 5, we will see that the guide blocks 115 have just moved into contact with the right hand ends of the slots 116 in the yokes 117. Further rotation of the transfer shafts results in the outward movement of the transfer bar and subsequent movement back toward the front of the machine where, in the 9 o'clock position of rotation, the transfer bars are again in engagement with shells on the rails. The resistance of the shells themselves and the limitations imposed by the slots in the spring guards 124 prevent further movement inward by the transfer bars. However, the guide blocks 115 are free to move inward in the slots 116 and the cessation of inward movement of the transfer bars does not exert any binding action on the shafts. During the remainder of the rotation of the shafts the transfer bars are constrained to move longitudinally as the crank pin returns to its starting point. Examining the relationship between the crank pin and the holding bar cam, it will be noted that the portion of the cycle in which the holding bars are completely withdrawn from the path of shells on the transfer rails coincides with that in which the transfer bars are executing their straight line movement while the holding bars are in holding engagement with the shells during the period in which the transfer bars execute their half-circular return movement.

Examining the over-all functioning of the straight line transfer, we see that the shells are delivered by gravity through the tubes and that the lowermost shell comes to rest on the transfer rails. As the transfer bars execute their return movement, the end fingers move in to grasp this shell and transfer it one step to the rear. Then the holding bars move in to secure the shell while the transfer bars return to pick up the following shell which meanwhile has dropped onto the transfer rails. Continuous operation transfers a double line of shells mouth-up by repeated rearward steps and pauses from the delivery tube to the position over the transfer punches 59 and 60 which lift the shells into the dial 58.

*Empty shell inspection*

To insure that a continuous double line of shells is passing through the straight line feed and that such shells are of the proper dimensions and free from obstructions, it is desirable to perform an inspection thereon. This is the function of the inspection punches 54 and 55, already referred to. These punches are supported for vertical reciprocating movement in a reciprocating block 125 best illustrated in Fig. 3. The block 125 is reciprocated in suitable guides by a lever 126 which receives swinging movement from a cam 127 on the shaft 117 and is timed to execute a downward movement during each period in which the shells are held stationary in the transfer mechanism. Compression springs 128 act against collars 129 on the punches 54 and 55 to continually urge them to the lowermost position in the block 125 permitted by the members 130 threadably received on the punch shanks and adjustably retained thereon by lock nuts 131. Swingably mounted on the block 125 and urged by spring 132 to swing counter-clockwise thereon is detector finger 133 provided with a notch 134. The members 130 secured to the punches are each provided with a gauge pin 135 which rides against the detector finger and in one position of the punches relative to the block 125 will drop into the notch and permit the detector finger to execute a counter-clockwise movement. The member 130 is so adjusted on the punch shank that the position in which such counter-clockwise movement is permitted coincides with the lowermost position of the block 125 with the lower end of the punch 54 or 55 supported on the base wad of a shell within normal tolerance dimensions. In the event the shell has a low or missing base wad or is absent altogether, the punch will remain in its lowermost position relative to the block 125 and the detector finger cannot swing. Similarly, if the base wad of the shell is high or the shell contains an obstruction, the punch will be raised more than a normal amount and the detector finger will be returned to substantially the position of Fig. 3, although with the pin 135 above the notch 134. Only when the punch is at rest on a properly dimensioned shell will the detector finger be free to swing.

The indication of the detector finger is utilized by means of an arm 136 which carries a screw 137 in alignment with a stop actuating push rod 138. This push rod extends vertically downward and in the event that the block 125 reaches its lower position without the detector finger having assumed its counter-clockwise position, the push rod 138 will be pushed downward by the screw 137. In the usual case of a perfect shell in proper position, the gauge pin 135 will drop into the notch 134 and the spring will swing the detector finger to a position where the screw 137 will not engage the rod 138.

The lower end of the push rod 138 bears on a lever 139 secured to a horizontally extending shaft 140 and on the left hand end of the shaft 140 a depending arm 141 is arranged to actuate a "Micro-Switch" 142 to deenergize the starter for the main drive motor. A latch 143 is suitably located and biased by a spring 144 to engage the arm 141 and hold it against releasing the switch until the obstructed shell has been removed.

In order to make it possible to remove and replace a defective or obstructed shell, the transfer track rails 89, 90, 91, and 92 are broken away just beyond the inspection station at the point where the inspected shell will occupy when the brake has brought the machine to a stop on actuation of the stop switch 142. In this region the rails are replaced by gates 145 which are mounted on a hollow shaft 146 surrounding the shaft 140. The gates 145 are provided with a handle 147 and are urged by an overcenter spring 148 to either occupy a position completing the track rails or to stand clear of the break in the track and permit both shells to fall into the operator's hand or a suitable receptacle. For convenience of construction, even though only one shell may have been found to be defective, both are removed and the bad shell, or both, in case the defect is not visually apparent, may be replaced from a stock of shells known to be perfect.

To conveniently release the stop switch when the defective shell is removed, the hollow shaft 146 is provided with a depending arm 149 in a plane adjacent the switch actuating arm 141. This arm is provided with a release pin 150 which extends across the arm 141 and latch 143 to disengage the latch when the gate is opened and to replace the latch by contact with the tip of the arm 141 until such time as the gate has been closed upon a pair of perfect shells. Release of the switch clears the main starting circuit and the machine may be restarted in the normal manner.

*Powder charger*

After the shells have been inspected by the mechanism just described, further operation of the straight line feed presents the shells beneath the powder charger 57. This powder charger is functionally identical with the powder charger disclosed in U. S. Patent No. 2,345,885, issued April 4, 1944, to which reference may be made for more detailed explanation of construction and advantages. Essentially, the differences in construction are only those necessary to accommodate a double row of shells and to provide a relatively wide range of adjustability in the weight of the powder charge to be delivered.

Briefly, the powder charger comprises a generally circular casing 151 housing a drum 152 formed with a double row of radially extending uniformly spaced bores 153. Each radially extending bore houses a slidable piston 154 which, during the upper quadrant of rotary movement of the drum, bears on an eccentrically mounted roller 155 carried on the lever arm 156 by which the degree of eccentricity may be regulated. The upper part of the housing is enlarged to provide a powder hopper 157 which is open to contact with the periphery of the drum 152. Suitable means, not shown because not important to understanding this operation, are provided to impart intermittent clockwise rotary movement to the drum in synchronous relation to the movement of the straight line feed. Starting at approximately 9 o'clock with reference to an imaginary clock face centered on the drum axis, it will be seen that a pair of plungers 158 are mounted on an arm 159 and actuated by appropriate linkage from the lever 126 to reach into each pair of radial bores in turn as they arrive at the 9 o'clock position. This not only verifies that the drum is in synchonism with the straight line feed but resets the pistons 154 to their innermost positions before they are indexed into the powder hopper. As the drum is indexed, the powder receiving pockets enter the hopper 157 at the bottom corner 160 where the powder is deepest and pressure greatest. The circumferential motion of the pocket ends through the bottom of the hopper causes sufficient agitation to insure that there will be no voids or bridging-over of powder in the hopper. As the inner ends of the pistons 154 ride up on the eccentric roller 155, the pistons move back toward the powder in the hopper to provide a uniformly compacted charge and one free from voids. At the 12 o'clock position of the drum, a rubber wiper blade 161 clears the surface of the drum and prevents leakage of powder from the hopper. Obviously, the vertical position of the eccentric roller is the governing factor in determining the amount of powder contained in the radial bores as they leave the hopper.

The next half of the casing 151 makes a close fit with the circumference of the drum 152 to avoid spilling powder as the charges are indexably moved toward the discharge position. However, to be entirely certain that the powder in the hopper has not become exhausted or that some other unforeseen difficulty has prevented the delivery of a proper charge to each pocket, an inspection operation is provided.

A support 162 is mounted on the casing 151 and provided with radially extending bores 163 in axial alignment with one of the positions in which the radial bores 153 pause as the drum is indexed. Inspection pistons 164 are slidably mounted in the bores 163 and biased by springs 165 to extend into the bores 153, stopping upon contact with the powder therein. During the periods in which the drum is in motion, the inspection pistons are held out of the way by similar levers 166, each pivotally mounted at 167 and each engaged with its piston through a crosshead 168 mounted thereon. The remote end of each lever has a lost motion connection through slots 169 with a pin 170 secured to a link 171 mounted on the lever 126 and actuated thereby during each period in which the drum and straight line feed are stationary to release the restraint upon the inspection pistons. Each inspection piston has mounted on the crosshead 168 an arm 172 carrying an adjustable switch actuating screw 173. These screws are so positioned that in the event that either inspection piston moves too far inwardly, indicating an insufficient or missing powder charge, the end of the screw will contact a plate 174 mounted on the operating plunger of a "Micro-Switch" 175 or similar short motion electric switch connected to throw out the switch on the main driving motor. At the lowermost position of the powder charger drum, a pair of openings 176 are provided directly over one of the at-rest positions of the pair of shells carried by the straight line feed. A shoe 177 on the casing 151 is provided with an upwardly and inwardly coned mouth 178 coaxial with the opening 176 to serve as a guide for the shell.

At the powder charging station the track rails 89 to 92 are again interrupted and are replaced in this region by blocks 179 providing a surface which serves as a continuation of the track and with upwardly extending internally grooved arms 180 arranged to engage above the rim of the shot shell riding on the track rails. The blocks 179 are mounted on push rods 181 actuated by a cam 182 on the shaft 114 to raise the block and cause the open mouth of the shell to enter into the conical mouth 178 and center the shell on the discharge opening in a non-spilling connection. The push rods 181 are connected to the blocks 179 by means including a pin 183, slot 184, and compression spring 185, and the push rods have sufficient length of travel to insure that any length of shell normally encountered will be securely held. The timing of the cam and powder charger is so related that the shells are raised immediately upon the cessation of the transfer movement and just prior to the arrival of the powder charger radial bores in alignment with the discharge openings.

As has been previously noted, the lever 126 executes a swinging movement during each period in which the straight-line feed and powder charger drum are stationary. This movement is used to control one more function by the provision of an arm 186 extending normally therefrom through a hole 187 directly above the position occupied by the inner end of the powder charger pistons 154. The swinging movement of the lever carries the arm 186 downwardly and positively discharges the powder into the shells.

Upon the completion of the powder charging operation, the push rods 186 are retracted to positively restore the shell base to the original plane of the transfer track rails by reason of the engagement of the grooves in the blocks with the rims of the shells. Successive operations result in the regular progression of shells charged with powder to the station where they are transferred to the dial.

*Transfer to dial*

Referring particularly to Fig. 5, it may be noted that the dividing bar 93 in the straight line feed terminates just to the rear of the transfer punches 59 and 60. At this point the dividing bar is flared to provide a generally T-shaped end section 188 opposing further movement of the shells in a rearward direction. In the region adjacent the punches, the dividing bar is relieved at 189 and similarly the last semi-circular recess 190 formed by the holding bar fingers 103 is on a larger radius so that shot shells in this terminal position on the straight line feed are but loosely retained in vertical position with their bases seated on the transfer punches.

The proper entry of the shells into the dial pockets is assured by a shell inserting guide, shown in section in Fig. 6, comprising a body 191 bolted to the top of the dividing bar 93. This body has formed in its lower face a pair of guide grooves 192 leading into the position over the punches and adapted to act as guides for the open mouth of the shells. Coaxial with the punches and of slightly larger radius than a shot shell rim, semi-circular notches 193 communicate between the lower and upper faces of the body. Conveniently, the lower or entry face of these notches will be funneled as at 194 to assist in centering the shell. A latch 195 is mounted on the body 191 by means including a link 196 urged by a spring 197 to draw the latch into closer relation to the body. The latch is formed with arcuate notches 198 and an appropriately funneled lead 199. A skirt 200 of the latch extends downwardly to form an abutment against which the open mouth of the successively fed shells will come to rest. This skirt portion is funneled at 201 and the body at 202 to avoid interference with the rim of a shell.

The extent to which the latch may be closed upon the body is limited by the stop pin 203 and by the shoulder 204 on the combined stop and guide pin 205. The lower face of the latch rests upon the T-section 188 of the dividing bar. A spring-urged latch 206 is also provided to intersect each of the notches 193 in the body to assist in maintaining the shell properly centered.

As has been previously noted, the shells are successively deposited in pairs at the end of the straight-line feed immediately over the transfer punches 59 and 60. The timing of the machine is so arranged that a pair of empty pockets 252 in the dial 58 will have been positioned thereover at substantially the same time that the shells are moved into position. During the period in which the dial and straight-line feed are stationary, a cam 207 (Fig. 38) raises the transfer punches to thrust the shells thereover up through the latch and seat them in pockets in the dial. The upper face of the latch immediately snaps in beneath the rim of the shell to positively retain it in raised position, and since this upper face is substantially in line with the upper face of a track 208 (Fig. 39) which encircles the base of the machine beneath the dial pockets, the shells will be smoothly transferred to succeeding stations. Preferably, the cam 207 will be formed to temporarily retain the transfer punches with their end faces in substantial alignment with the face of the latch and track 208 during the time that an inspection is performed.

*Powder charge inspection*

As has been previously noted, the ram 62 is arranged to reciprocate vertically on an axis parallel to the axis of the dial pockets. This reciprocating motion is imparted to the ram by means of a crank 209 (see Fig. 38) on the main shaft 210, which crank is received in a block 211 slidably received in a yoke 212 secured to the ram. The reciprocating stroke of the ram is timed to be completed during the period in which the dial is stationary.

Mounted on the ram at the station where the shells are inserted in the pockets is a bracket 213 provided with axially parallel bores 214 in axial alignment with the corresponding pair of pockets 252 in the dial 58. Each of these bores receives in slidable relation a stop sleeve 215 which is constrained against rotation by a key 216 received in suitable slots. The longitudinal position of the stop sleeve is adjusted by means of a nut 217 threaded thereon and provided with a shoulder 218 received beneath a stop block 219 on the bracket 213. A spring-urged detent plunger 220 engages with suitable depressions in the lower face of the nut to releasably secure it in the desired position.

An inspection plunger 221 is slidably received in an axial bore in the stop sleeve and is resiliently urged downward relative thereto by a spring 222 engaged between the bracket and an adjusting flange 223 on the plunger. The upper end of the plunger is threaded to match with threads in a block 224 by which the extent of downward extension is limited. The block 224 is non-rotatable relative to the bracket by reason of the engagement of its flat rear face with the stop block 219. A locking block 225 is engaged with the plunger by a slidable connection including a key 226 and appropriate slots so that it is constrained to rotate with the plunger but free to slide lengthwise thereof. Stop bracket 227 is secured by suitable machine screws to the block 224 and overlaps the upper face of the locking block 225 so that longitudinal movement of the plunger is communicated to the assembly of block 224 and locking block 225 as a unit. A spring-urged detent plunger 228 is engageable with suitable recesses in the upper face of the block 224 to releasably maintain any desired adjustment of the amount by which the plunger extends below the stop sleeve.

To the lower end of the plunger there is secured an axially extending inspection punch 229 which, for the purposes of powder charge inspection, is preferably a non-sparking material such as copper, brass or a beryllium copper alloy. This punch has a diameter only slightly less than the inside diameter of a shell and, as the ram descends, is adapted to enter into a shell and come to rest upon the charge of powder or other contents thereof. As previously mentioned, the transfer punches have a slight dwell at the top of their stroke and preferably the base of the shell will be supported on both the end face of the transfer punch and the upper face of the latch 195 at the time this operation takes place. In this way, the outer end of the gauging block 224 is established as a reference point whose vertical location when the ram approaches its lower position is capable of direct correlation with the charge of powder in the shell.

A pair of plates 230 are secured to the bracket 213 in position to provide vertically extending slide faces which have a ramp-like termination at 231. The plates 230 each cooperate with a hanging lever 232 pivotally supported from the top frame 233 and spring-urged to swing toward the bracket 213. An adjustably disposed gauge bar 234 is provided on the lower end of each hanging lever and arranged to slide on the edge of the corresponding plate 230, moving inwardly on contact with the ramp portion 231. If the punch 229 is at rest on a proper charge of powder, the bar will then swing under the lower face of the block 224 and come to rest against its outer end in position to be picked up and returned to its normal position by the ramp 231 as the ram is raised. If the powder charge is insufficient, the block 224 will not be high enough and, as the gauge bar 234 clears the end of the plate 230, it will bridge over any gap and be held out by the interengagement of the end faces of the gauge bar and block 224. In the event that the powder charge exceeds the correct amount, the block 224 will rest in an elevated position. An overcharge inspection is provided by mounting an overcharge gauge bar 235 on the hanging lever in such relationship as to prevent the inward swing of the hanging lever whenever the block 224 rests in a position higher than normal.

A stop finger 236 mounted on the hanging lever 232 is disposed in the path of a reject bar 237 mounted on the end of a reject lever 238 which is pivotally mounted on the bracket 213. If the hanging lever is prevented from swinging in as a result of the impingement of one of the gauge bars upon the end face of the gauge block, the stop finger 236 will remain in the path of the reject bar 237. Contact of the reject bar with the relatively fixed stop finger will at once impart a clockwise swinging movement to the rejection lever, which movement will continue until the ram has stopped in its lowermost position. If the gauge bars properly straddle the gauge block, the hanging lever will have been permitted to swing in toward the bracket to an extent which puts the stop finger out of the path of the reject bar 237 and no swinging movement will be imparted thereto.

Conveniently, there may be secured to the remote end of each reject lever a clapper 239 adapted to strike a gong 240 and sound an audible alarm each time a rejection lever is operated.

An adjustable screw 241 is provided in the same end of each of the reject levers and contacts a reject push rod 242 which is urged upwardly by a spring 243. Obviously, the swinging of the rejection lever will impart to the rejection push rod a downward movement relative to the bracket 213 which is utilized to set one of the reject pins 70 or 71 corresponding to the particular dial pocket of the pair. As has previously been mentioned in general discussion, it is the function of the reject pin to trip a reject fixture 72 at station #13 and eliminate those shells which have been found to be defective or incomplete.

The adjustment of this unit for proper inspection may most conveniently be carried out by placing in the dial pockets at station #1 a pair of shells which are known to have perfect base wads and to be charged with the desired amount of powder. With the inspection punch raised to its highest position by means of the adjusting flange 223 and threaded connection to the block 224, the ram may be lowered to bottom dead center by means of the hand crank 69. In this position the inspection punch is lowered by adjustment of the flange 223 until the punch has come to rest upon the charge of powder and the gauging block 224 has been raised above the upper end of the plate 230 by a distance sufficient to permit the gauge bar 234 to swing thereunder without restraint by the ramp 231 on the plate 230.

The gauge bars 234 and 235 may then be adjusted to clear the lower and upper edges of the gauging block 224 with the desired tolerance for permissible variations in charge. This adjustment permits the hanging lever to swing inwardly and the position of the stop finger 236 may be checked or adjusted relative to the bar 237 to verify that there is slight clearance and that the reject lever will remain in its normal position to which it is urged by the spring 243. The adjusting screw 241 may then be set to move the reject push rod 242 downwardly until it is near but not touching the top of the reject button therebeneath. The adjustment may, if desired, be checked by feeding through shells which are known to have over or under charges beyond permissible limits.

*Shell presence inspection*

At this first station on the dial, it is desirable to arrange to operate a machine stop in the event there has been some failure to feed a shell to a dial pocket. If the machine were permitted to operate with an empty pocket, it would be necessary to install auxiliary equipment to prevent the delivery and spilling of shot, filler wads, etc., at the succeeding stations. Since failures to feed shells are of infrequent occurrence, a machine stop is the economical solution.

An inspection weight 244 may be mounted on each inspection punch 229 at station #1 with freedom to slide thereon, within the limits imposed by a stop 245 mounted on the bracket 213 and engageable with a shoulder 246 on the weight. As the ram descends, the weight will be lowered and, if a shell of normal height is present in the dial, will come to rest upon the mouth thereof. A stop switch operating lever 247 is provided with laterally extending arms 248 extending into the path of both of the weights and is mounted on a suitable fixed bracket 249 in such a location as to be operated by either of the weights in the event that a shell is missing from the dial or has been distorted to less than normal height in prior handling. A stop switch 250 which may be a "Micro-Switch" or similar type is provided with its operating button in alignment with the end of the lever 247 to be actuated by swinging movement thereof. Preferably, this stop switch will be of the type which will lock out until manually released and having once opened the circuit to the main driving motor, will not permit that circuit to be reestablished until manually released. This will help to insure that the machine will not be inadvertently restarted without replacing a shell of proper characteristics in the dial pocket concerned.

It may be noted at this point that a fixed stop arm 251 may conveniently be secured to the machine base and extended over the rim of the dial pockets at the first station to prevent the upward displacement of a dial pocket 252 in the event that one of the lock screws 253 has been lost and to prevent undue strain on the lock screw in the event of a jam in transferring a shell into the dial. The proper shell may be inserted into the dial after an automatic stop by removing both stop arm and lock screw, whereupon the dial pocket may be removed and reinserted with a proper shell in place therein.

*Wad feeding*

As the machine continues to operate, the dial is indexed from station to station by means which will be described in more detail near the end of the specification by reference to Figs. 35 to 39. It is sufficient for the understanding of the loading operations to realize that the dial is turned by the distance between stations during each period that the ram is at and near top dead center and that the dial is locked in position during all periods that the ram is appreciably below top dead center.

The apparatus at stations #2 through #6 is arranged to feed over-powder and filler wads into place above the shell mouths and to insert them into the shells in the proper position. The wad feed fixture 64 (Figs. 9 and 10) provides essentially duplicate arrangements at each station for feeding wads of different dimensional characteristics and any desired combination of two or three of the feeds may be utilized. The wad inserting and inspecting heads 63 (Figs. 7, 7*a*, and 8) are, with certain omissions, identical with the powder inspecting head 61 already described.

Wads of the desired characteristics may be fed by any suitable type of wad hopper mechanism in edge-to-edge relation and delivered to this machine through wad feed tubes 254 of rectangular cross-section. Conveniently, the hopper mechanism may be located on top of the top frame 233 and the feed tubes may extend substantially vertically downward therefrom. To alert the operator in the event of an incipient failure in the supply of wads at the point of delivery to the shells, an alarm mechanism is provided.

The wad feed alarm mechanism comprises a generally horizontal shaft 255 rotatably supported in brackets 256 carried on the feed tubes. This shaft is given periodic oscillating movement by means of a lever 257 coupled to a reciprocatink link 258. Mounted on the shaft 255 between the tubes of each pair of wad feed tubes are five lever arms 259. These arms are coupled by springs 260 to feeler levers 261, one for each feed tube, rotatably mounted on the shaft 255 and provided with fingers 262 projectable, in the absence of a wad in the tube, through slots in the wall thereof. If the tube is properly full of wads, the springs 260 will simply be extended without rotating the feeler arm materially. An indicator shaft 263 is rotatably supported in parallelism with the shaft 255 and is provided with five lever arms 264 which overlie extensions of the anchor pins 265 for the springs 260. Thus, in the event that any feed tube is not properly filled with wads, the corresponding feeler will move into the tube. The raising of the spring anchor pin 265 beneath the adjacent lever arm 264 will result in imparting a rotary movement to the indicating shaft 263. At one end the indicating shaft is provided with a switch arm 266 opposed to the operating button 267 of a normally open switch 268 which may be of the "Micro-Switch" type. This switch may be connected in circuit with an electric gong to sound an audible alarm in the event of a failure in the supply of wads in the tube. Obviously, the alarm for any unused pairs of tubes may be disabled by the simple expedient of removing the springs 260 from the feeler arms associated therewith.

The generally vertical wad feed tubes 254 deliver by gravity into the wad feed fixture 64 where the lowermost wad in each tube comes to rest upon a horizontal shelf 269. Side walls 270 assist in defining a horizontal feed passage of rectangular cross-section substantially the same as that of the feed tube. A detent 271 is urged downwardly by a spring 272 to assist in controlling the wads as they are fed through a delivery tube 273 of similar cross-section but twisted to gradually turn the wads into position with the faces horizontal. The feeding of wads into the delivery tube is accomplished by a feed finger 274 adjustably mounted on an arm 275 mounted on a shaft 276 with freedom for rotation relative thereto. Between each pair of arms 275 there is fixed to the shaft 276 a double armed crank 277, one arm of which carries a cross-pin bearing against adjustable screws 278 in the arms 275 while the other arm serves to provide anchors for springs 279 which may be hooked between the anchor and the arm 275. As a convenience, each spring may be provided with a finger tab 280 to assist in attaching and releasing. The shaft 276 is driven with an oscillating motion synchronized with the ram by means including a crank 281 secured to the shaft and coupled to a reciprocating push rod 282 following a cam 283 in the base of the machine.

Each clockwise oscillation of the shaft 276 will result in the feed finger 274 advancing the lowermost wad into the horizontal delivery tube 273 and during such advance the upper surface of the feed finger acts as a stop for the vertical tube. As the feed finger retires, the detent 271 will retain the wad just fed and a succeeding wad will drop down in the front of the finger.

Each delivery tube terminates over a dial pocket station and axially in line with the station is provided with openings to allow the passage of the punch of a wad inserting and inspecting head 63. A spring 284 of flat cross-section is arranged to receive the wads and to releasably grip the edges thereof while supporting each wad in turn directly above the dial pocket station. A bushing 285 is provided with a tapered throat and supported directly over the dial pocket station to receive and radially compress the wads to a diameter slightly less than that of the shells.

As previously noted, the wad inserting and inspecting heads 63 are similar to the powder charge inspecting head 61 with certain omissions, particularly the elimination of the overcharge gauge bar 235 and the elimination of the shell presence inspection weight and elements associated directly therewith. The same reference numerals have been applied to those components which are identical.

As each punch 229 descends with the ram, it passes through the opening in the horizontal delivery tube 273 to push the wad gripped by the spring 284 downwardly through the bushing 285 and into the shell. There is a functional difference in the operation of this assembly for wad insertion in that the stop sleeve 215 is adjusted by the nut 217 into a vertical position correct to engage the flange 223 on the plunger 221 and positively seat the wad in the proper position if the force of the spring 222 is not alone adequate to seat the wad.

Fig. 7 shows the relative position of the head 63 which is inserting a second filler wad 286 on top of a filler wad 287 and an over-powder wad 288. The bottom dead center position of the ram and associated parts is shown in dot-dash lines. As shown in this view, the punch 229 has already come to rest in substantially its proper position and further downward movement of the ram will result in freeing the hanging lever 232 from the restraint of the plate 230 to swing in and clear the reject bar 237 carried by the reject lever 238 which moved downward with the ram. As shown in the dot-dash lines, the lower end of the reject push rod 242 still clears the reject button.

Fig. 7*a* shows the relative locations of the various parts at the same station as Fig. 7 in the position they would occupy at bottom dead-center in the event there had been a failure to feed both the overpowder wad and the second filler wad. It will be noted that the inspection punch is in its lowermost position and that the gauging block 224 forms substantially a continuation of the face of the stop plate 230. The gauge bar 234 has, therefore, remained in its outward position, maintaining the stop finger 236 beneath the bar 237 on the end of the reject lever. The final portion of the downward movement of the ram has lowered the reject lever pivot relative to the stop finger 236, thus swinging the lever in a clockwise direction to strike the gong 240 and project the push rod 242 downwardly to set the reject button 70. For reasons which will become more apparent in connection with the subsequent discussion of the reject fixture, the reject pins 70 corresponding to the leading one of each pair of dial pockets are shorter or do not project through the dial as far as the reject pins 71 which correspond to the lagging one of each pair of dial pockets.

The operations of wad insertion and inspection are identical at each of the five stations, any two or three of which may be selected, to successively add filler wads to a particular shell. To eliminate the feeding of a wad at any particular station, all that is necessary is to stop the delivery of wads to the particular vertical feed tubes 254 serving that station, disable the wad feed alarm for those tubes by removal of the springs 260, and preferably stop the operation of the feed fingers 274 by removing the appropriate springs 279 by means of the tabs 280.

*Shot charging*

The shot charger 65 (Figs. 11 and 12) is mounted to overlap both stations #7 and #8 and to secure greater spacing, and more convenient manufacture of the charging plate simultaneously charges the lagging shell of one pair at station #8 and the leading shell of the following pair at station #7. Operating power is supplied to the shot charger by means of a cam 289 on countershaft 290 engaged with a lever 291 to impart a rocking motion to vertical shaft 292 during each period in which the dial is stationary. Lever 293 is mounted on shaft 292 and converts its rocking movement into horizontal rectilinear movement by engagement in a slot 294 formed in a charger plate 295. Suitable guide means are provided to direct this charger plate for reciprocation in a direction substantially radial relative to the dial between a position in which charging holes 296 are over the shells to be charged and a position in which these charger holes are beneath outlets 297 in the bottom of a shot hopper 298. The shot hopper is preferably provided with a transparent window 299 and may be kept supplied with shot through a tube 300 leading from any suitable source of supply. Rubber bushings 301 surrounding the outlets 297 minimize the abrasion of shot as the charger plate is moved from beneath the outlets. To permit the ready replacement of these bushings they are mounted in an apertured plate 302 which may be removed by sliding horizontally counter to the direction of rotation of the dial. A handle 303 is provided to facilitate this removal and a locking pin 304 normally retains the plate in place.

Adjustment of the size of the shot charge is provided by replaceable bushings 305 fitted in the charging holes 296. These bushings may be removed and replaced with those of more appropriate size as desired by manually operating the machine with hand crank 69 until the charging plate is over the dial stations. At this position the bushings may be removed by removing cap screw 306 and plate 307 which closes the openings in the hopper casting above the discharge position.

Provision is made for temporarily stopping the charging of shot or for emptying the hopper by utilizing the shiftable control plate 308 which, during ordinary operation, has its openings 309 disposed directly above the discharge station. A handle 310 is provided by which the stop plate may be shited inwardly upon release of lock pin 311 and re-engaged with the lock pin in recess 312. In this position the openings 309 are outside the range of reciprocation of the charger plate holes 296 and no shot will be delivered. A third position is provided with a recess 313 to receive the lock pin 311 and in this position the openings 309 are disposed beneath the hopper outlets 297. If the stop plate is moved to this latter position when the charging plate is also disposed thereunder, the shot will flow from the hopper through the chute 314 into any suitable receptacle placed to receive them.

*Top wad feeding and inserting*

Top wads may be fed to the shell for conventional roll crimp loading by means of a top wad feed fixture 67 particularly shown in Figs. 13 and 14 and located at station #9. The top wads are inserted into the shell by an inserting and inspecting head 66, identical in construction and functioning with those used to insert the other wads. The inspection performed here has the double function of checking both for the presence of the top wad and for the size of the shot charge. To absolutely insure that a shell in which the thin top wad is missing is rejected, the inspection punch 315 which has the same function as the punch 229 may be formed with a hollow center into which some of the shot will tend to flow in the absence of a top wad. With the machine set up for the more recently developed wadless closure, a flat ended punch 229 may be used with the sole function of inspecting the size of the shot charge. With this type of closure the top wad feed fixture 67 may be either removed or disabled by means to be discussed below.

The top wad feed fixture is driven from the counter-shaft 290 by a cam 316 mounted thereon and engaged with a cam follower 317 on bell crank 318. Forked end 319 on the bell crank converts the swinging motion to reciprocation by engagement with a block 320 on vertical push rod 321. Conversion of vertical reciprocation to horizontal reciprocation is accomplished by crank 322 centrally mounted on horizontal shaft 323 and provided with laterally extending stop blocks 324 and laterally extending spring anchor pins 325. A pair of horizontally spaced levers 326 are mounted on the shaft 323 with freedom for rotation thereon and are coupled by the springs 327 to the anchor pins 325. A pair of horizontally spaced levers 326 are mounted on the shaft 323 with freedom for rotation thereon and are coupled by the springs 327 to the anchor pins 325. Adjustable screws 328 bear on the stop blocks 324 in such a manner that upward movement of pushrod 321 imparts positive counter-clockwise rotation to the levers 326 while downward movement of the push rods urges the levers 326 clockwise through the medium of the springs 327.

At their upper ends the levers 326 are each received in a slot 329 in similar reciprocating blocks 330. Each reciprocating block has secured to its upper face a blade 331 which is of the same thickness as a top wad and which is formed at its inner end to semi-circular shape complementary to that of a top wad. The upper housing 332 is formed to define a pair of tubular guides 333, each adapted to receive a stack of top wads which may be gravity fed from tubes 334. The tubular guides 333 terminate one wad thickness above a base plate 335 and through this space the blades 331 are reciprocated. As the blades retire, the stacks of top wads settle to the base plate and on the advance of the blades the lowermost wad is stripped from each stack and moved horizontally into a guide track 336 leading to a position directly above the dial station. Exact positioning of the wads is aided by a stop plate 337 semi-circularly recessed in axial alignment with the dial station and a flared bushing 338 radially compresses the wad as it is pushed therethrough by the punch 315 and seated in the shell mouth.

The stop sleeve 215 is adjustable to seat the wad in the proper position and the gauging operation and setting of the reject pin in the event of a lower than normal position of the top wad are carried out in the same manner as at the other wad inserting stations. To insure that any possible jams may be cleared without delay, the tubular guides 333 are vertically slotted at 339 and the horizontal guide track 336 is similarly slotted at 340 to permit the use of a sharpened hooked in removing a jammed wad.

*Shell printing*

The usual and most convenient location for the printed legend identifying the size of shot and other loading data is on the end face of the top wad in the case of a roll crimp shell or upon the seal disk in the case of the wadless closure. With a roll crimp shell the printing may be most readily accomplished before the crimp has been turned. Accordingly, the printing fixture 68 is located at station #11 when the machine is set up for roll crimp operation. With a wadless closure, the identical printing unit may be set up at station #27 to print on the end face of the seal disk.

The printing unit comprises a bracket 341 secured to the ram 62 and provided with suitably bushed axially parallel bores 342 arranged to receive a pair of plungers 343 which are urged downward therein by springs 344. Limits are placed on the extent of movement of the plungers by a bar 345 secured to the bracket and engaged with cutouts 346 in the plunger shank. An adjustable lower limit is placed on the position of the plunger by means of a crosspin 347 engaged in slot 348 in bolt 349. This bolt is threadably received in a knurled adjusting nut 350 releasably retained in any desired position of adjustment by detent 351 and prevented from rising materially above the upper face of the bracket by a hold-down clamp 352. Upon the lower end of the plungers 343, punches 353 are suitably secured and provided with type characters spelling out the desired legends. Each time the ram 62 descends, the type characters are brought into contact with the shell positioned therebeneath to imprint the desired legend upon the top wad or seal disk.

The supply of ink upon the printing faces of the type characters is renewed for each stroke by inking rollers 354, rotatably mounted on a frame 355 which is swingably mounted on a sub-bracket 356 hinged to the bracket 341. A spring 357 engaged between the bracket 341 and the frame 355 continually urges the frame to swing clockwise about its swingable mounting on the sub-bracket. Screw 358 is adjustable to raise or lower the sub-bracket and with it the inking roller carrying frame 355 to regulate the pressure of the inking rollers upon the type faces.

The position of the inking rollers is controlled as a function of the vertical position of the ram through the medium of a control cam 359 mounted on an ink reservoir housing 360 which is fixed on the base of the machine adjacent the dial. A cam follower roller 361 mounted on the frame 355 follows the control cam as the ram descends, permitting the inking rollers to travel across the face of the type. In case the spring 357 should break or the inking roller pressure be too great to permit the frame to swing under spring tension, an auxiliary cam follower 362 is arranged to contact the end 363 on the cam and positively throw the frame across to a position in which the roller is out of the way of the printing punch. As the cam follower 361 swings outwardly under spring urging, the inking rollers 354 are brought into contact with an ink distributing surface 364 on the housing 360 and during the remainder of the ram stroke are maintained in rolling contact with this surface by the spring 357.

It will be noted that the control cam is fixed on a shaft 365 which is pivotally supported on the reservoir housing 360 and provided with a depending arm 366 to which a spring 367 is secured. Another downward extension 368 of the control cam carries a stop screw 369 adjustably positionable to limit the amount which the control cam can turn in a counter-clockwise direction. The forces of the springs 357 and 367 and the lengths of the lever arms concerned are such that in the upper dead center position shown in Fig. 15, the control cam will be turned counter-clockwise to the maximum extent permitted by the stop screw 369. As the ram descends, the cam follower 361 follows the cam until the inking roller contacts the surface 364 and during this movement the length of the lever arm between cam follower 361 and shaft 365 is decreasing, with the result that spring 367 shifts the control cam in a clockwise direction. As the ram rises, the superior force of the spring 357 again becomes evident, shifting the control cam until it is stopped by the screw 369 and extends the spring 357 as the inking rollers are moved to their innermost position.

The oscillations of the control cam are utilized to feed ink to the distributing surface 364 by mounting on the lower end of the depending arm 366 a ratchet pawl 370 spring-urged into engagement with a ratchet wheel 371. The ratchet wheel is fixed on a transverse shaft to which is also fixed an ink feed roller 372 between the side plates of the reservoir housing 360. A portion of the circumference of the roller 372 forms a downward continuation of the distributing surface 364 and the major part of the remainder is exposed to the inside of the reservoir formed between the side plates of the housing 360 and the flexible bottom plate 373. For convenience in cleaning the ink reservoir, the housing 360 is pivoted at 374 to an ink reservoir base 375 to which the bottom plate 373 is affixed. The housing 360 and base 375 are secured together as a working unit by a removable cross-pin 376 passing through the side plates of the housing and a block 377 secured to the base. Control over the thickness of the film of ink on the feed roller is maintained by means of screws 378 engaging the flexible bottom plate 373 and capable of urging it into closer engagement with the feed roller.

To review the operation of the printing unit, it may be noted that each time the ram descends, the inking rollers cross over the type faces into contact with the ink distributing surface. At the lower end of the stroke the type imprints the desired legend on the shell and the inking roller picks up fresh ink from the feed roller. As the ram rises, the fresh ink is uniformly distributed on the inking rollers in a thin film by rolling over the distributing plate. At about the point where the inking roller reaches the top of the distributing plate, the pressure of the cam follower roller against the control cam causes the cam to shift counter-clockwise, thus feeding more ink from the reservoir. During the remainder of the upward movement, the control cam is rigidly held against the stop screw and the reaction of the cam follower thereon swings the inking rollers across the type faces to the starting position.

*Reject mechanism*

At this point in the cycle of operations, the shell should be substantially complete and, as previously noted, the detection of any missing components or other defects should have caused the setting of the appropriate reject pin 70 or 71 adjacent the particular dial pocket. Any reject pin which has been so set is utilized to control the reject fixture 72 which performs the function of removing the support from beneath the head of the defective shell and immediately thereafter passing a reject plunger through the dial opening to insure that the scrap shell has been removed therefrom. The reject fixture may conveniently be located at station #13 to discharge rejected shells through a chute 379 in the base of the machine. Reference may be had to Figs. 17, 18, and 19 for details of construction.

Each reject pin 70 is associated with the leading pocket of the similar pairs of dial pockets and each reject pin 71 is associated with the lagging pocket. To assist in distinguishing whether a leading or lagging pocket contains a shell which should be rejected, the reject pins are staggered slightly and each pin 70 in its upper position projects only slightly, if at all, below the face of the dial. In contrast, each reject pin 71 in its upper position projects below the dial by a distance approximately equal to the diameter of the pin. The setting of either reject pin causes it to extend about a pin diameter below its normal or upper position. A reject shoe 380 is provided to cooperate with the pins 70 and a similar, but downward and radially inwardly positioned, reject shoe 381 is provided to cooperate with each pin 71.

The reject shoes are each rigidly secured to reject slides 382 provided with suitable guides on the base of the machine, constraining them to reciprocating movement beneath the positions of the dial pockets when stationary at station #13. Each reject slide is provided with an area 383 and an area 384 in substantially the same horizontal plane as that of the shell head track 208. A portion of each slide is overlaid by a latch 385 which is urged by a spring 386 into such a position that its upper face serves to provide with the areas 383 and 384 a substantially continuous track across the reject chute. To insure against the possibility of a smash-up due to descent of the reject plunger prior to retraction of the slide, the inner edge of each latch is beveled at 387 to provide for camming the latch out of the way and allowing a shell to pass through the cut-out 388 to the reject chute 379 whenever forcibly pushed down. In a normal operation of the unit the appropriate reject slide will be cammed outwardly by the reject pin and the end of the raised portion 383 will contact the face of the latch 385 and swing it out of position beneath the head of the shell. All support being then removed from beneath the head of the shell, it may fall through the opening 388 to the reject chute or, in the event it sticks in the dial pocket, will be pushed therefrom by the plunger actuated by means to be described in the succeeding paragraphs. The normal inward position of the reject slides may be adjusted by means of screws 389 bearing on the base of the reject fixture 72.

Transverse shaft 390 supported on the fixture 72 provides pivotal support for reject plunger trip arms 391 which are urged by springs 392 to swing in a counterclockwise direction about the shaft. The lower end of each trip arm is received in a slot in the appropriate reject slide and bears on a crosspin 393 secured therein. By these means the spring 392 constantly urges the slides to their normal inner position and any outward movement of a slide is communicated directly to the proper reject plunger trip arm. Each plunger trip arm 391 is provided at its upper end with an adjustably disposed trip hook 394 which normally engages a pin 395 on the coupling lever 396 holding the hook 397 in engagement with the head of stop bolt 398 against the urging of spring 399. It will be noted that the coupling levers are pivotally mounted on a pair of similar plunger levers 400 supported from the top frame 233 by a bracket 401. The free end of each lever 400 is provided with a head 402 of circular cross-section secured in a mating slot in the block 403. This connection to the block 403 serves to convert the swinging movement of the lever into reciprocating movement of the plunger 404 upon which the block is mounted, and which is guided for reciprocation through station #13 by suitable bushings in the top frame 233 and reject fixture 72. The bottom end of the plunger is provided with a head 405 adapted to enter the mouth of a shell and engage the end wall thereof and may also be provided with the loose collar 406 arranged to engage outside the mouth of the shell and to stop upon contact with the face of the dial pocket 252 while the plunger continues through the pocket.

The operation of either reject slide results in a clockwise movement of the corresponding trip arm and the resulting inward movement of the trip hook 394 allows the spring 399 to disengage the coupling lever from the stop bolt 398 and to simultaneously engage the notch 407 with a pin 408 mounted on the vertically reciprocating ram 62. It will be recalled that the ram is at or near top dead center each time the dial is indexed. Since the movement of the reject slide is, through pins 70 and 71, a function of indexing the dial, the operation of the coupling lever will take place at a time which insures that on the succeeding downward stroke of the ram the coupling lever will have been latched to the pin 408 each time a reject slide has been operated. By reason of the longer arc swung by the head 402 on the lever 400, the downward movement of the plunger will be amplified relative to that of the ram and may easily be made sufficient to pass entirely through the dial pocket.

As a safety factor to prevent machine damage in the event of a jam in one of the dial pockets, the mounting of the pin 408 on the ram 62 is arranged to yield to an overload. This arrangement includes an angle bracket 409 pivotally supported on a bracket base 410 on the ram and normally retained in the position shown in Fig. 17 by means of a shear pin 411 passing horizontally through the bracket base and the depending leg of the angle. To facilitate replacement of the shear pin, the holes through the bracket base may be releasably covered by pivoted plates 412. In the event that the shear pin is either partially or completely severed by an overload, the relative horizontal position of detector pin 413 will be moved inwardly, in which position it will contact the face of detector lever 414 and swing the upper end thereof away from the actuating button of a normally closed switch 415 which is connected in circuit with the starter of the main drive motor. The releasing of this switch immediately cuts out the motor, thus preventing operation with a disabled reject system.

The proper return of the reject plunger to its normal latched position is facilitated by the adjustable screw 416 mounted in the bracket base 410 and engaging beneath the plunger levers 400 to positively lift them to their normal upper position each time the ram rises to top dead center.

*Shell crimping*

The crimping operation closes the heretofore open mouth of the shell by means of two operations performed by the crimping fixture 73 at the adjacent stations #15 and #16. Figs. 20 and 21 show the construction of the crimping fixture and Figs. 22 and 23 show the tool layout for, respectively, roll crimp and wadless closures. Although the operations differ slightly for the two types of closure, the structural differences are so slight that it is believed they may best be described together.

In view of the comparatively high pressures exerted on the shells and the necessity for uniform crimping, it is considered best to provide yielding auxiliary support for the shell heads rather than depend entirely upon the shell head track 208. Accordingly, the track is apertured to permit the passage of a bottom support plunger 417 beneath each pocket at the crimping stations. These four plungers are each provided with a spring thrust collar 418 which is engaged by a coil spring seated between the collar and the top of thrust block 419 through which the lower end of each plunger passes freely. The thrust block 419 is secured on a crimping support plunger slide block 420 guided by suitable means for vertical reciprocation which is imparted to it by means of a cam follower riding in a track in crimping plunger cam 421 on the main shaft 210. In this way, each shell is raised slightly and yieldingly held with its rim in engagement with the lower face of the dial pocket 252. A stop block 422 is mounted rigidly on the crimping fixture 73 and overlies the upper face of the dial pockets at the crimping station to prevent their upward displacement in the event of a lost or defective dial pocket lock screw 253, and to prevent any upward shifting of the dial in its bearings which would influence inspections at previous stations.

The downward pressure required for crimping is developed by a crimping slide cam 423 adjacent the crimping plunger cam 421 acting through a suitable follower on a crimping slide block 424 coupled by a pull rod 425 to the crimping slide 426 guided for vertical reciprocation in the crimping fixture 73. Adjustably secured to the upper end of the crimping slide are four separate shifting forks 427, each of which engages between thrust bearings 428 assembled on crimping shafts 429. Each shaft 429 also carries a pinion 430 which meshes with an intermediate drive gear 431 driven by a gear 432 on crimper drive shaft 433. A belt 434 couples the drive gear to a suitable motor 435 mounted on the top frame of the machine. It will be noted that the intermediate device gears 431 are elongated vertically and that as the crimping shafts are reciprocated vertically, the pinions 430 slide up and down the intermediate gear remaining meshed therewith.

The lower end of each crimping shaft is provided with a shoe 436 arranged in the usual fashion to roll a crimp on the end of the shell. Details of the roll crimp shoes are shown in Fig. 22. By suitably adjusting the vertical position of the two crimping shafts, the crimp may be rolled in two stages starting at station #15 and finishing at station #16. This increases tool life by lessening the strain on tools and improves the quality of the crimp. This type of closure is one which has been long used.

For producing the wadless crimp which is the subject of Patent No. 2,242,907 previously referred to, the intermediate drive gear 431 meshing with the pinions 430 on crimper shafts for station #15 may be removed to render those shafts stationary and the shoes 437 provided at station #15 and 438 at station #16. As described in the patent, the shoes 437 at station #15 form in the end of the body a number of creases defining substantially triangular areas, and the end of the shell is thereby drawn into frusto-conical form. When the rotating shoes 438 are brought down upon the frusto-conical end, the segments are forced inwardly to form a planar end closure. This closure may then be completed by the application of a suitable seal disk of paper or other material by means which will be described after completing the description of apparatus peculiar to the roll crimp shell.

*Shell waterproofing*

When the machine is set up for roll crimp operation, the stations from #17 to #26 inclusive are idle and the next operation is at station #27 where a small, precisely measured quantity of a waterproofing lacquer or drying oil is metered into the end of the crimped shell by a waterproofing fixture 74 shown in Figs. 24 and 25. The waterproofing liquid penetrates into and tightly seals the top wad and the crimp against the penetration of moisture into the body of the shell where its effect upon powder and primer is undesirable.

The waterproofing fixture comprises a reservoir 439 secured to the base of the machine and preferably provided with a sight glass 440 for visual determination of the fluid level therein. A pair of pump cylinders 441 having side ports 442 are secured to the base of the reservoir and receive close fitting pistons 443, each provided at its lower end with a ball check valve 444 and urged upwardly by a spring 445 engaged between the reservoir cover and a thrust collar 446 adjustably mounted on the piston shank. A stop bracket 447 is positioned to engage the flanges of both thrust collars and place a positive limit on upward movement thereof. In parallelism with the axis of the dial pockets at station #27, a pair of guide bushings 448 are mounted and slidably receive the applicator nozzles 449. Each applicator nozzle is provided at its upper end with a thrust collar 450 substantially identical with the collars 446 and is coupled in fluid conveying relation to the appropriate piston through flexible tubing 451.

In order to insure that the waterproofing material will not be discharged to an empty dial pocket, the piston actuating means is made dependent upon the reaction to the contact of the applicator nozzle with the top wad. This result is brought about by providing an actuator lever 452 swingably supported from the reservoir body and urged by a spring 453 to occupy a normally raised position relative thereto. This lever is urged downwardly during each downward stroke of the ram by disposing its free end 454 in the path of some reciprocating member carried by the ram. Conveniently, this may be the reciprocating portion of the ejector fixture 75. Pivotally supported on opposite sides of the actuator lever are a pair of rockers 455, each engaging at one end one of the thrust collars 446 and at its other end one of the thrust collars 450. Thus, as the actuator lever is moved downwardly, the pivot for the rockers 455 moves down. Since the applicator nozzles are not at first opposed, the rockers pivot about the spring-opposed thrust collars 446 and seat the nozzles on the top wad if a shell is present in the dial pocket. If no shell is present, the nozzle continues down and the rocker continues to pivot about the collar 446. In the normal case in which a shell is present in the pocket, the applicator nozzle is positively stopped upon contact with the top wad and during the remainder of the actuator lever travel the thrust collar 450 serves as the pivot for the rocker 455. With the position of one end fixed by the stationary thrust collar 450 and the center pivot continuing to move downwardly, the spring 445 is necessarily compressed, forcing the piston 443 into the cylinder 441. As the lower end of the piston cuts off the ports 442, the remainder of the fluid in the cylinder is forced through valve 444 into the body of the piston. During regular operation, the tubing 451 and applicator nozzles 449 are maintained full of fluid and the diameter of the nozzle opening is preferably so related to the surface tension of the fluid as to prevent dripping from the end thereof. By these means, as each shell arrives at the waterproofing station, it has deposited upon its top wad a quantity of waterproofing fluid adequate to spread over the top wad and to penetrate into the surface thereof and into the crimp joint sufficiently to provide a waterproof seal.

*Finished shell ejection*

Dial station #28 is the final station and at this station there is located the ejector fixture 75 which transfers the finished shells from the dial to a delivery track 76. Figs. 26, 27, and 39 may be referred to for details.

The base of the machine is recessed beneath the dial to receive the end of the duplex delivery track 76 which lines up with the position of the dial pockets at station #28. This same recess receives the ejector rocker arm 456 carried on shaft 457 which receives an oscillatory movement from lever 458 arranged to follow the groove on cam 459 on the main shaft. The fingers 456a on the end of the rocker arm are arranged to swing into the grooves of the duplex track 76 and to advance the shells therein at each oscillation of the shaft. The timing of the cam is so arranged that the indexing of the dial to its new position takes place during the interval in which the rocker arm is at or near its position of maximum advance into the track. Since the upper edges of the track rails and the upper surface of the rocker arm are in substantial alignment and only slightly below the surface of the shell head supporting track 208, the finished shells move smoothly into place over the track. During the period in which the dial is stationary the rocker arm retires, removing the support from beneath the heads of the finished shells and permitting them to drop into the track if they are free in the pockets.

To avoid any difficulty which might arise as a result of a swollen shell which tends to remain in the pocket, the fixture 75 is mounted on the ram and provides means to pass a punch through the pocket to insure that the shell has been ejected. This fixture comprises a bracket 460 mounted on the ram and carrying a pair of bushings 461 in parallelism with the pockets at station #28. These bushings receive the ejector plungers 462 which are urged by springs 463 to extend downwardly to the limit permitted by gauge plates 464 and lock nuts 465. A double cap 466 is mounted on the pair of bushings 461 and provides a pivotal mounting for a gauge lever 467 which is spring-urged to swing clockwise until stopped by the engagement of the gauge notch 468 with one or both of the gauge pins 469 secured in plates 464. Should any particular shell resist ejection with a force greater than that of the spring 463, the appropriate plunger will be displaced upwardly. In this conditon the gauge pin 469 no longer rests in the notch 468 and the gauge lever will have been displaced counter-clockwise into a position engaging the operating button of normally closed switch 470, in series with the other stop switches and arranged to throw out the main starter whenever the circuit is broken. To insure that an attempt will not be made to restart the machine without clearing trouble at this particular station, the stop switch 470 is arranged to latch in until released by operation of button 471. With these precautions, it is practically impossible for the dial to carry a loaded shell into station #1 where a jam would occur as the machine attempted to insert a new shell into the dial.

GENERAL DISCUSSION

With the exception of a few details which will be described here, this completes the description of the machine as set up for roll crimp operation. The following material is common to both roll crimp and wadless closure operation and is of some assistance in fully understanding either type of operation.

Prior to starting any given pair of dial pockets around the machine for a second cycle of loading operations, it is essential that the reject pins 70 and 71 be reset in position to respond to the indication of a substandard condition by any of the inspection operations provided. It will be recalled that when set to operate the reject fixture, the pins 70 and 71 extend below the dial for a distance greater than normal. Referring to Fig. 39, it will be seen that a pair of reset cams 472 have been mounted upon the upper face of the machine base beneath the dial and in alignment with the path traveled by the lower ends of the pins. As the pins ride over the cams any pin which is in its lower position will be shifted back to the upper position ready to commence a new cycle.

Fig. 39 also shows clearly the shell head track 298 which provides support for the heads of the shells except where it is interrupted for the installation of the various fixtures which, in themselves, provide shell head support in these regions.

By reference to Figs. 36, 37, and 38, and particularly Fig. 36, the arrangement for indexing the dial and locking it in place should be made clear. As has been previously noted, the countershaft 290 in the base of the machine is driven in synchronism with the main crank shaft 210. The indexing cam 473 is mounted on the countershaft and is arranged over a little less than half its circumference to provide a double spiral cam 474 between which there is received one of the follower rollers 475 which are mounted in angularly spaced relationship corresponding to that between the successive stations on a dial indexing plate 476 which is, in turn, engaged with the dial carrying hollow shaft 477. As the countershaft rotates, the double cam 474 smoothly advances the dial by one step and as the follower reaches the end of the spiral portion, a planar holding portion 478 enters between the roller just advanced and the succeeding roller to lock the dial stationary. At the end of the planar portion of the cam, the succeeding roller is advanced by the double spiral. Thus, during each revolution of the counter-shaft the dial is stationary for slightly more than half the time and during the remainder of the time the dial is smoothly indexed to a new position.

The main crank shaft and the counter-shaft are geared together in a one-to-one relationship and so timed that top dead center of the crank is reached at the half-way point in dial indexing. Thus, each time the ram descends to working position, the dial is locked in place by the planar portion of the indexing cam. As noted, the dial carrying shaft 477 is hollow and it is through this hollow shaft that the ram shaft reciprocates.

Fig. 40 is a schematic wiring diagram in which the lines supplying power are shown in heavy lines while those circuits used solely for control purposes are in light lines. This diagram shows clearly the series relationship of the various automatic stop switches 415, 142, 175, 470, and 250, any one of which will break the circuit through the solenoid 560, causing the main starter 561 to drop out. Simultaneously, the starters 562 and 563 controlling respectively the shell abrading motor and the shell feed hopper motor also drop out. A push button switch 564 is provided to enable running the shell feed hopper independently for the purpose of filling the shell feed tubes 52 and 53 in advance of starting the main motor. It will also be noted that the stop switch circuit includes a double throw push button switch 565 which may be operated to cause the machine to stop and which, when held in position to close its normally open contacts, completes a circuit through the actuating coil of relay 566. The operation of this relay functions to apply power to the release coils 567 associated with a spring brake on the main motor. Ordinarily, the current to these coils is stopped when the main motor cuts out and the spring actuated brake brings the machine to an immediate stop. To make it possible to operate the machine by the hand crank 69, the push button switch 565 is held down and the relay 566 supplies power directly to the coils 567 to disengage the brake.

It will be noted that the control circuit for the main motor is fed from the starter 568 controlling the crimper motor and that there is therefore no possibility that the machine, as a whole, may be operated without running the crimper. The wad feed motor may be independently controlled through the starter 569.

*Wadless closure operation*

Reference has been previously made herein to minor differences in the operation of certain units when the machine is set up for roll crimp and for the wadless type of closure of Patent No. 2,242,907. The remaining fixtures which are to be described are peculiar to the latter type of closure and therefore separately described. These fixtures are installed in the blank stations following that at which the crimping fixture is installed.

*Shell abrading*

As noted in Patent No. 2,242,907, it is sometimes desirable to roughen or abrade the flat surface of a wadless closure prior to the application of the sealing disk. Such abrasion facilitates the penetration of the adhesive into the fibers of the paper and permits the securing of a more perfect bond. The abrading operation may be carried out by an abrading fixture 77 located at station #17 and illustrated in Figs. 28 and 29.

The abrading fixture comprises a base 481 secured to the base of the machine proper and provided with a transverse shaft 482 upon which a bell crank arm 483 is mounted for angular adjustment by screw 484. The outer end of the bell crank arm supports a horizontal shaft on which the wire brush 485 and pulley 486 are journaled. Driving power is supplied to the wire brush by a belt 487 leading to a suitable motor 488 located on the top frame 233.

As shown in Fig. 28, the screw 484 is adjusted to such a position that each shell passing beneath the wire brush will have its end face lightly abraded. The flexibility inherent in the wire brush is adequate to compensate for height variations greater than those permitted by the crimping unit which is arranged to crimp the shells to a predetermined length and which accurately maintains that length.

*Seal placing*

The seals are blanked from a roll of adhesively coated tape and initially secured to the end of the shell by a seal placing fixture 78 located at station #20 and illustrated in Figs. 30, 31, and 32. Reference may also be had to Fig. 39 for a clearer view of those portions of the unit otherwise obscured by the dial.

It will be recalled that previous inspection operations which had found defective shells had resulted in an appropriate setting of the reject pins 70 and 71 and in the rejection of the defective shell at station #13. Obviously, it would not be desirable to feed a seal disk to a dial pocket in which there was no shell for the loose disk might lead to a subsequent jam and, at best, would needlessly clutter up the machine. Accordingly, those reject pins which were depressed to operate the reject fixture are again utilized to prevent seal placing at a blank pocket.

A pair of horizontal slides 489 are provided with shoes 490 cooperating with the reject pins in the same manner as the reject shoes 380 and 381 to cause an outward movement of the slide 489 corresponding to any empty pocket. A knee 491 on each slide engages a spring 492 seated in the base of the seal placing fixture to resiliently oppose outward movement of each slide. Each slide also has secured to its outer end an upstanding hook 493 which, in its normal inner position, engages a mating hook 494 in the lower end of a coupling rod 495. Each of the coupling rods is guided for vertical reciprocation in the fixture 78 and is urged upwardly therein by a spring 496 engaged between the fixture 78 and the end of a coupling block 497 secured on the rod 495. A generally similar coupling block 498 is provided in the upper end of each of a pair of similar punch carrying vertical slides 499 guided for vertical reciprocation in suitable ways on the fixture 78. Operating levers 500 are provided with slots 501 which slidably receive blocks 502 and 502*a*, respectively, journaled in the coupling blocks 497 and 498. Each operating lever is jointed as at 503 and provided with a spring 504 arranged to hold the joint in a position determined by the stop pin 505 and adjustable screw 506. Each operating lever is coupled at 507 to the vertically reciprocating ram 62. With the coupling rod 495 latched down in its normal position, the downward movement of the ram causes the lever 500 to pivot about the sliding block 502 journaled in coupling block 497 and by reason of the engagement with the block 502*a* to impart reciprocating downward movement to the slides 499. Should either one of the shoes 490 be engaged by a depressed reject pin, the outward movement of the associated slide 489 will release the lower end of the coupling rod 495 which will then be spring-urged upwardly. During the next succeeding reciprocation of the ram, the lever 500 associated with the outwardly moved slide will pivot about the bearing of the sliding block 502*a* journaled in the upper end of coupling block 498. Obviously, a limiting consideration in the selection of the spring 496 is that it be sfficiently powerful to support the entire weight of the coupling rod, the punch carrying slide and associated parts, and substantially half the weight of the actuating lever 500. A stop 508 positively limits upward movement of the slide.

As the ram moves downward, its force is carried through the spring 504 which holds the joint in the actuating lever in its normal position. Obviously, any unusual resistance to the movement of the vertical punch carrying slide cannot result in a tool smashup, for the spring will be extended before any damage can be done. On the upward or return stroke of the ram, motion is positively transmitted through the actuating lever to raise the punch carrying slide back to its upper position, or, in the event that the coupling rod had been released by a depressed reject pin, to compress the spring 496 and restore the coupling rod to its normal lower position in which it will be retained as the reject pin moves away from the shoe 490. However, should the coupling rod have become unlatched in some way which permitted the slide to return to an inner position prior to the return of the coupling rod, the beveled surfaces of the hooks 393 and 394 will slide over each other and permit the hooks to re-engage.

Each of the vertical slides 499 is arranged to mount on the axis of the appropriate pocket at station #20, a combined blanking and heating punch assembly 509 comprising an annular hard steel blanking punch 510 within which there is coaxially supported a heating punch 511 urged by the spring 512 to project slightly beyond the end face of the blanking punch and electrically heated by a suitable heating unit 513 supplied with current through cable 514.

In the base of the fixture 78 there are provided a pair of guide bushings 515 through which the blanking punches reciprocate. Immediately below the guide bushings the fixture base provides a guide track 516 for the adhesively coated tape 517. This track is disposed at an angle to a line joining the two punch centers to allow the greatest economy in blanking the seals from the strip consistent with the physical separation of the punches. Immediately below the tape guide track the tape blanking dies 518 are supported to cooperate with the annular blanking punch 510. Thus, each time a vertical slide descends, it blanks a disk out of the tape 517 while the thermoplastic adhesive thereon is caused to adhere to the shell therebeneath as a result of the application of heat and pressure by the spring-urged heating punch 511.

Commencing in the region of dial station #18, the shell head supporting track 208 (see Fig. 39) is inclined downwardly to define a ramp 208*a* which lowers the heads of the shells and permits the crimped end thereof to pass under the base of the fixture which is mounted close to the dial to minimize the travel of the seal from blanking position to the shell end. To insure that the shells do follow the incline, a fixed cam block 519 (Fig. 32) overlies the path of the dial pockets. This inclined portion of the track leads the shell heads into a pair of movable track blocks 520 which are grooved to receive the rims on the shell heads and which are vertically reciprocated during the period in which the dial is stationary by push rods 521 under the upward urge of coil springs 522. During those periods in which the ram is at or near top dead center, the springs are held compressed by a bell crank 523 which engages the spring thrust collars 524 to forcibly lower the push rods. This bell crank is pivotally mounted in the lower casing of the machine and is provided with a cam follower roll 525 engaged with the reciprocating cam 526 carried on a lateral extension 527 of the ram yoke 212. In this way each shell is spring-urged upwardly into the mouth of the die 518 at the time the seal is blanked from the tape, avoiding any possibility for the seal to be placed in other than perfectly centered relation. As the track blocks are lowered by the bell crank 523, the shell ends are withdrawn from the dies sufficiently to permit them to pass beneath the fixture as the dial is indexed to a succeeding station. In the region of station #21, the shell head track is inclined upwardly defining a ramp 208*b* to again raise the shell to the plane of the rest of the track after it has passed from beneath the seal blanking dies. With the machine set up for roll crimp operation, a continuous constant level track would be provided through this region.

*Tape feed*

A large roll of the thermoplastically coated tape 517 is carried in a reel 528 supported on the top frame 233 and is fed through suitable wire guides 529 and guide roller 530 to a tape feed roller 531 journaled in bearings supported on the base of the seal placing fixture 78. Pressure is maintained to hold the tape in frictional engagement with the feed roller 531 by means of spring 532 acting through arms 533 and pressure roll 534. The circumference of the feed roller 531 is tangent to the tape guide track 516 and the roller acts to feed the tape thereinto.

Feeding movement is imparted to the feed roller by means of a ratchet wheel 535 secured on the feed roller shaft cooperating with ratchet pawl 536 mounted on the arm of bell crank 537. The bell crank is journaled on the base of the seal placing unit and receives a periodic movement by means of follower roll 538 which rides in cam 539 secured to the same bracket on the ram 62 as that to which the levers 500 are coupled at 507. Thus, each time the ram descends, the tape is fed through by an increment of length corresponding to the diameter of the seal to be blanked therefrom. Feeding of the tape is rendered more certain and tangles of the blanked web of tape are avoided by means of a take-up roller 540 journaled in a bracket 541 on the base of the machine and coupled to the feed roller 531 by chain 542 to rotate in synchronism therewith. A suitable pressure roller 543 is also provided as well as a spring-urged tension block 544 engaging the chain 542. The web of blanked tape may be fed from the take-up roller to any convenient receptacle for disposition as scrap.

To briefly review the functioning of the combined units at station #20, the shells are successively positioned in pairs at this station by the indexing of the dial. As each pair of shells approaches the station, the track supporting the heads declines in the ramp 208*a* and the cam block 519 insures that the shells follow down this ramp to a position which will clear the underside of the die holder. As the shells stop at the station where their heads are engaged by the track blocks 520, they are raised into the blanking die. As the ram descends, the bell crank 537 indexes the tape ahead one step and the levers 500 lower the vertical slides so that the annular punches 510 blank out disks from the tape 517, which disks are secured on the end face of the shell immediately beneath by the heated punches 511, maintained by suitable automatic means at a temperature high enough to soften the thermoplastic coating on the tape and cause the tape to adhere to the end of the shell. As the ram rises toward top dead center, the shells are drawn out of the blanking dies by the track blocks 520 and indexed to the following station, rising to their normal positions in the dial as the heads ride up the inclined portion 208*b* of the shell head track.

In the event that any shell had been found defective and ejected for scrapping at the previous station #13, that particular dial pocket will be empty and the reject pin 70 or 71 will still be depressed. The delivery of a seal to this blank pocket is prevented by the engagement of any depressed reject pin with a shoe 490 which moves a slide 489 outwardly to disengage the hook 493 from the coupling rod 495. When so disengaged, the coupling rod spring 496 causes the lever 500 to pivot about the coupling pin in the vertical slide 499, with the result that the vertical slide remains in its uppermost position and fails to blank out a seal from the tape.

*Seal heating*

Within practical limits it is not possible to apply at a single station a sufficient amount of heat and pressure to insure uniform adhesion of the seal to the whole end face of the shell. The heated punch at the seal placing station is therefore only relied upon to provide sufficient heat and pressure to insure that the seals will remain in place until the shells have been removed from the seal placing station and conveyer to a station where more convenient means can be utilized to apply further heat and pressure to complete the sealing operation.

This final application of heat and pressure is conveniently spread over stations #22 through #26 inclusive, and the heating fixture 79 there mounted, and shown in detail in Figs. 33 and 34, is arranged to apply radiant heat to the shells during the entire period that they remain in these stations and during every downward stroke of the ram to apply direct heat and pressure thereto.

Mounting bracket 545 is secured on the main frame and provides a journal for hinge pin 546 upon which the heater frame 547 is swingably mounted. Directly over the arc swung by the dial pockets the hot plate 548 is secured to the heater frame and protected against casual contact with an operator's arms or hands by heat shield 549 formed of any suitable asbestos or other insulating board. The hot plate 548 is shaped to define a segment of an arc having the same radius as the path of the dial pockets and is provided with a planar lower face 550 preferably highly polished and chromium plated or otherwise treated to provide a permanently smooth surface to which any excess of adhesive or other foreign material will not readily adhere. Any conventional type of electric heating unit may be employed which will uniformly distribute the heat over the lower surface of the plate and which can be readily controlled to maintain a constant temperature by any suitable conventional means. With an illustrative type of ethyl cellulose coated tape, this temperature should be maintained at 375° F.

Spring-urged buttons 551 are mounted in the shell head supporting track 208 beneath each of the heating stations to provide a yielding support for the shells thereat. Obviously, to provide for unobstructed dial indexing, the upper face of these buttons should be flush with the face of the track when no pressure is applied thereto. During each period in which the dial is stationary, pressure is applied to the shells by swinging the hot plate down into contact with the seal. This movement is imparted to the hot plate by means of a push rod 552 extending between the heater frame 547 and an arm of bell crank 553 which is swingably mounted on the top frame 233. The lower arm 554 of the bell crank is provided with a follower 555 riding in the track of a cam 556 which is mounted on the ram 62 for reciprocation therewith.

To facilitate opening up the heating unit for cleaning of the face 550, the pin 557, by which the push rod 552 is secured to the bell crank 553, is provided with an annular groove 558 to receive the spring detent 559. The detent spring is very simply disengaged, whereupon the pin may be removed and the heating unit swung outwardly upon its hinged mountings to expose the hot plate face 550 uppermost in a position permitting ready inspection of the surface and cleaning with a suitable solvent of any adhesive material which may tend to accumulate thereon in spite of the polished surface.

During the entire period of their travel through these four stations, the seals are exposed to radiant heat from the hot plate and at each station the hot plate is firmly pressed thereon. This continued application of radiant heat and the repeated applications of direct heat and pressure soften the adhesive and cause the seal to adhere so tenaciously to the end face of the crimp that upon firing, the seal ruptures along the lines of the inturned folds of the closure with each segment adhering to the fired shell and extracted therewith. The tenacious bond obtained in this way permits full realization of the strength of the seal in providing the optimum resistance to crimp opening needed for the most efficient ignition and combustion of the propellent powder.

*Shell printing and finished shell ejection*

The final application of heat and pressure to the seal completes the operations on a shell of the wadless closure type with the exception of printing the load identification and any other desired material upon the face of the seal. This printing operation is carried out with the fixture 68 already described which is for this purpose installed at station #27. The fixture operates in exactly the same manner as when printing on the top wad of a roll crimp shell.

The completed wadless closure shell is ejected from the machine at station #28 by the same apparatus and in the same manner as already described in connection with roll crimp operation and no further description appears warranted.

SUMMARY

In view of the preliminary outline first presented and the progressive nature of the various operations, each of which has been separately described, it does not appear necessary to encumber the specification with any further review of construction and operation.

We wish it to be clearly understood that our invention resides in the novel combination of elements associated in this machine and in the novel construction of certain of those particular elements. Although our invention has been illustrated by specific drawings and descriptions relating to a typical machine, we do not consider that our invention is limited to the specific construction illustrated. Accordingly, reference may be made to the claims appended hereto for a definition of the limitations upon the scope of our invention.

We claim:

1. An ammunition loading machine comprising shell transfer means arranged to cause shells carried therein to be successively positioned at a plurality of spaced stations; reject pins on said shell transfer means having a raised inactive position and a depressed active position, there being one of said pins corresponding to each shell carried by the transfer means; inspection means at certain of said stations arranged to inspect said shells and to move to depressed position the reject pin corresponding to any improperly assembled shell; means at a reject station actuated by engagement with a depressed reject pin to remove the improperly assembled shell from the transfer means; closure applying apparatus at a station following the reject station to apply an end closure to a properly assembled shell; and means at said station following the reject station also actuated by a depressed reject pin to temporarily uncouple said closure apparatus and thereby prevent the application of a closure to that portion of the transfer means from which the improperly assembled shell had been removed.

2. An ammunition loading machine comprising a dial having a series of uniformly spaced pairs of openings therein; means to indexably advance said dial to successive circumferentially displaced positions, the spacing between such positions being equal to that between said pairs of openings; means at one of said stations for inserting a pair of shot shell bodies into adjacent pockets in said dial; duplex means at said circumferentially displaced positions for performing operations on said shell bodies; inspecting means at certain of said stations to inspect said shell bodies and determine that the proper operations have been performed thereon; a reject pin for each dial pocket operated by said inspecting means in the event the proper operation has not been performed on the shell body in the corresponding pocket; ejecting means at a reject station engaged by any reject pin which has been operated, said ejecting means being arranged to cause ejection of the shell from the corresponding dial pocket; closure applying apparatus at an operating station following the reject station to apply end closures to properly assembled shells; and means at said closure applying operating station also engaged by any reject pin which has been operated to prevent the operation of the said closure apparatus when there is positioned in opposition thereto a dial pocket from which a shell body has been ejected.

3. In an ammunition loading machine having means to position a shell at a station, a ram arranged for reciprocation toward said shell on an axis parallel to that of said shell, the improvement in tools mounted on said ram for operating on shells positioned at said station comprising a bracket secured to said ram, an inspection plunger slidably mounted in said bracket having mounted thereon a punch arranged to be inserted into the shell bodies positioned in opposition thereto as said ram reciprocates downwardly, spring means compressible when said inspection punch comes to rest upon a component within a shell body arranged to normally extend said plunger in the direction of a shell body, a gauging block on said plunger, a gauging lever swingably mounted on a fixed part of said machine and spring biased to swing toward said gauging block, a plate fixed on said bracket arranged to oppose swinging movement of said lever until said bracket approaches the lower limit of its downward reciprocation, gauge bar means on said gauging lever arranged to contact said gauging block and prevent swinging movement of the lever if said inspection punch does not come to rest upon components of the proper height within said shell body, said gauge bar means being also arranged to clear said block and permit swinging movement of the lever when said inspection punch does come to rest upon components in said shell body of the proper height, a stop finger on said gauging lever, a rejection lever pivoted on said bracket arranged to engage said stop finger during the final stage of downward movement of said bracket only if swinging movement of said gauging lever has been prevented, and rejection means operable by swinging movement of said rejection lever when said rejection lever does engage said stop finger.

4. The apparatus described in claim 3, said gauge block means comprising separate spaced gauge bars mounted on said lever, one of said bars being arranged to contact the gauging block if the inspection punch rests upon shell components of greater than proper height, and one of said bars being arranged to contact the gauging block if the inspection punch rests upon components of less than proper height, the space between said gauge bars standing opposite said gauging block when the inspection punch rests upon components of the proper height, whereby swinging movement of the gauging lever is permitted only when the punch rests upon components of the proper height.

5. In an ammunition loading machine having shell transfer means arranged to cause shells carried therein to be successively positioned at a plurality of spaced stations, and a ram arranged to carry tools for operating on said shells, said ram being reciprocable on an axis substantially parallel to the axis of the shells carried by said transfer means during the time interval between said stepwise movements, the improvement in tools for operating on the shells successively positioned at one of said stations comprising a bracket secured to said ram; an inspection punch carried on said bracket arranged to enter the shell bodies successively positioned thereunder; a weight slidably mounted on said inspection punch having an end surface extending radially outward from said punch; stop means on said bracket arranged to prevent said weight from sliding off the end of the punch; and machine stop switch means mounted on a support on said machine in the path of the weight reciprocating with said punch, said weight being arranged to stop upon contact with the mouth of a shell into which said punch enters, and said switch means being arranged to be engaged and actuated by said weight if said weight moves with the punch beyond the position at which said weight would be normally stopped in contact with the mouth of a shell of the proper height.

6. In an ammunition loading machine having means to position a shell at a station, a ram arranged for reciprocation toward said shell on an axis parallel to that of said shell, the improvement in tools mounted on said ram for operating on shells positioned at said station comprising a bracket secured to said ram, a sleeve non-rotatably mounted in said bracket with freedom for longitudinal sliding movement therein coaxial with the position of a shell at said station; adjustable means engaged between said sleeve and said bracket arranged to position said sleeve longitudinally, an inspection plunger slidably received in said sleeve; spring means urging said plunger downwardly in said sleeve in the direction of a shell at said station; flange means on said plunger engageable with said sleeve to limit upward displacement of the plunger relative to the sleeve; an inspection punch mounted on said plunger constructed and arranged to be inserted into a shell body at said station as said ram is reciprocated downwardly; a gauge block adjustably secured to said plunger above said sleeve and limiting the spring urged downward extension thereof, said spring means being arranged to yield when said punch comes to rest upon the contents of said shell body to permit the punch and said gauge block to remain stationary during further downward reciprocation of said ram until said flanged means is engaged by said sleeve; a gauging lever swingably mounted on a fixed element of the machine and spring biased to swing toward said gauge block; a gauge bar mounted on said gauging lever and extending toward said bracket; a plate fixed on said bracket providing a vertically extending track upon which said gauge bar may slide as the ram descends, said plate terminating at the lower edge of the spring extended position of said gauge block, and being laterally positioned slightly further from the axis of said plunger than said gauge block; whereby said gauge bar will contact the gauge block and prevent inward swinging of said lever unless the position at which said punch has come to rest upon the contents of a shell is indicative of the proper height of components therein; and means operable on failure of said lever to swing inwardly for causing the rejection of the shell at said station.

7. The apparatus described in claim 6, said last-mentioned means comprising a stop finger on said gauging lever; and lever means mounted on said bracket arranged to contact said stop finger and be operated thereby during final downward movement of said ram when said gauge bar through engagement with said gauge block has prevented inward swinging of the gauging lever.

8. The apparatus described in claim 7, said lever means being pivotally mounted intermediate its ends, one end having a portion moving as said ram reciprocates in a path including the position occupied by said stop finger when said gauging lever has been prevented from swinging inwardly; and a plunger in position to be engaged by the other end of said lever means and moved downwardly thereby when said lever means has been operated by contact of the first-mentioned end thereof with said stop finger.

9. In an ammunition loading machine having a shell transfer dial with a series of spaced shell carrying pockets therein, support means beneath each of said pockets, driving means arranged to impart stepwise rotary movement to said dial to cause said pockets to be successively positioned at circumferentially spaced stations, and a ram arranged to carry tools for operating on shells in said pockets and reciprocable on an axis substantially parallel to the axis of the pockets during the time intervals between said stepwise movements, the improvement in said tools for operating on the shells successively positioned at one of said stations comprising a reject pin mounted in said dial adjacent each of said shell receiving pockets, said pins each having a raised inactive position and a lowered active position in which said pin protrudes from the lower face of the dial; inspection means at the prior stations to move to active position a reject pin corresponding to any pocket containing an improperly assembled shell; a slide forming a part of the support means beneath the shells in said pockets; a shoe on said slide engageable by a reject pin in active position constructed and arranged to cam said slide out of shell supporting position as the dial is moved to position an improperly assembled shell over said slide; a plunger reciprocably supported over said slide; and means actuated by movement of said slide to couple said plunger to the ram for reciprocation through the dial pocket to positively reject such improperly assembled shell.

10. The apparatus described in claim 9, said last-mentioned means comprising a trip hook moved by said slide, a coupling lever restrained by said trip hook and spring urged to move from a position of engagement with a fixed part of the frame of the machine to a position of engagement with the reciprocating ram for reciprocating movement therewith; and means communicating the reciprocating movement of the coupling lever to said plunger.

11. The apparatus described in claim 10, said coupling lever being pivotally supported on a plunger lever arm engaged with the plunger; the upper end of said coupling lever being provided with a hook engageable with said fixed part of the machine and the lower end of said coupling lever being provided with a hook engageable in a pull transmitting connection with said ram.

12. The apparatus described in claim 11, means pivotally supporting from a fixed part of the frame the end of the plunger lever remote from the end engaged with the plunger, said coupling lever being pivotally mounted on the plunger lever between the ends thereof, whereby the plunger will have a greater length of reciprocating movement than said ram.

13. In the apparatus described in claim 9, a spring-urged latch cooperating with said slide to form a part of the shell supporting means at the reject station, said latch being formed with a beveled shell supporting surface so constructed and arranged that the application of a load tending to force a shell downwardly from a dial pocket will act through the shell head on said beveled surface to cam the latch against the urging of its spring out of shell supporting position to permit the discharge of a shell even though said slide may not have been cammed outwardly.

WARREN S. REYNOLDS.
JOHN R. TURNER.
LEON C. FRANDSEN.

References Cited in the file of this patent

UNITED STATES PATENTS

| Number | Name | Date |
|---|---|---|
| 347,030 | Franklin | Aug. 10, 1886 |
| 387,500 | Eckerson | Aug. 7, 1888 |
| 644,493 | Blakeman | Feb. 27, 1900 |
| 659,724 | Wills | Oct. 16, 1900 |
| 702,151 | Peters | June 10, 1902 |
| 1,602,181 | Stoessel | Oct. 5, 1926 |
| 1,602,334 | Candee | Oct. 5, 1926 |
| 1,770,620 | Mann | July 15, 1930 |
| 2,061,576 | Huyett | Nov. 24, 1936 |
| 2,224,204 | Wassen | Dec. 10, 1940 |
| 2,318,856 | Hoffman | May 11, 1943 |
| 2,356,266 | Ogilvie et al. | Aug. 22, 1944 |
| 2,366,811 | Sibson et al. | Jan. 9, 1945 |
| 2,380,167 | Grim | July 10, 1945 |
| 2,383,297 | Dorothea | Aug. 21, 1945 |
| 2,407,062 | Darroh | Sept. 3, 1946 |
| 2,418,949 | McNally | Apr. 15, 1947 |
| 2,430,080 | Reynolds | Nov. 4, 1947 |
| 2,464,830 | Shellem | Mar. 22, 1949 |